United States Patent
Zeng et al.

(10) Patent No.: US 11,696,262 B2
(45) Date of Patent: *Jul. 4, 2023

(54) COMMUNICATION METHOD AND COMMUNICATIONS APPARATUS

(71) Applicant: HUAWEI TECHNOLOGIES CO., LTD., Shenzhen (CN)

(72) Inventors: Yongbo Zeng, Shenzhen (CN); Hongcheng Zhuang, Shenzhen (CN); Da Wang, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,100

(22) Filed: Sep. 13, 2021

(65) Prior Publication Data
US 2022/0095284 A1   Mar. 24, 2022

Related U.S. Application Data

(63) Continuation of application No. 16/325,180, filed as application No. PCT/CN2016/095051 on Aug. 12, 2016, now Pat. No. 11,153,852.

(51) Int. Cl.
  *H04W 72/04*   (2023.01)
  *H04W 72/53*   (2023.01)
  *H04W 72/56*   (2023.01)

(52) U.S. Cl.
  CPC ........... *H04W 72/04* (2013.01); *H04W 72/53* (2023.01); *H04W 72/56* (2023.01)

(58) Field of Classification Search
  None
  See application file for complete search history.

(56) References Cited

U.S. PATENT DOCUMENTS

| | | | |
|---|---|---|---|
| 2014/0328329 | A1 | 11/2014 | Novlan et al. |
| 2015/0215981 | A1 | 7/2015 | Patil et al. |

(Continued)

FOREIGN PATENT DOCUMENTS

| | | |
|---|---|---|
| CN | 103843444 A | 6/2014 |
| CN | 104081845 A | 10/2014 |

(Continued)

OTHER PUBLICATIONS

3GPP TR 22.591 V14.1.0 (Jun. 2016), 3rd Generation Partnership Project, Technical Specification Group Services and System Aspects; Feasability Study on New Services and Markets Technology Enablers; Stage 1 (Release 14), Jun. 2016, 95 pages.

(Continued)

*Primary Examiner* — Walter J Divito
(74) *Attorney, Agent, or Firm* — Maier & Maier, PLLC

(57) ABSTRACT

Embodiments of the present invention disclose a communication method and a communications apparatus. In the communication method, a network-side device determines a resource configuration policy. The network-side device determines an operation mode of a terminal based on the resource configuration policy; broadcasts information about a plurality of configured resource pools and the operation mode, so that the terminal performs sending based on the configured one or more resource pools; and determines, based on the operation mode, that the terminal sends information on one or more resource units of the plurality of resource pools. According to the communication method and the communications apparatus provided in the specific embodiments of the present invention, the one or more resource pools are configured for a plurality of carriers for inter-terminal communication, so that the terminal can send a message on the one or more resource pools of the plurality of carriers.

17 Claims, 14 Drawing Sheets

(56) References Cited

U.S. PATENT DOCUMENTS

| | | |
|---|---|---|
| 2015/0327180 A1 | 11/2015 | Ryu et al. |
| 2015/0351076 A1 | 12/2015 | Pais et al. |
| 2016/0278150 A1 | 9/2016 | Jung et al. |
| 2016/0360524 A1 | 12/2016 | Blasco Serrano et al. |
| 2016/0374135 A1 | 12/2016 | Martin |
| 2017/0006621 A1 | 1/2017 | Jung et al. |
| 2017/0006653 A1 | 1/2017 | Zeng et al. |
| 2017/0048856 A1 | 2/2017 | Sorrentino et al. |
| 2019/0021111 A1 | 1/2019 | Tang |

FOREIGN PATENT DOCUMENTS

| | | |
|---|---|---|
| CN | 104936292 A | 9/2015 |
| CN | 104955017 A | 9/2015 |
| CN | 105165081 A | 12/2015 |
| CN | 105208664 A | 12/2015 |
| CN | 105706511 A | 6/2016 |
| WO | 2015115951 A1 | 8/2015 |
| WO | 2015140039 A1 | 9/2015 |
| WO | 2015143170 A1 | 9/2015 |
| WO | 2015147617 A1 | 10/2015 |

OTHER PUBLICATIONS

3GPP TR 36.885 V14.0.0 (Jun. 2016), 3rd Generation Partnership Project; Technical Specification Group Radio Access Network; Study on LTE-based V2X Services;(Release 14), Jun. 2016, 216 pages.

3GPP TS 36.213 V13.2.0 (Jun. 2016), 3rd Generation Partnership Project;Technical Specification Group Radio Access Network;Evolved Universal Terrestrial Radio Access (E-UTRA);Physical layer procedures(Release 13), total 381 pages.

3GPP TS 36.214 V13.2.0 (Jun. 2016), 3rd Generation Partnership Project;Technical Specification Group Radio Access Network;Evolved Universal Terrestrial Radio Access (E-UTRA);Physical layer;Measurements(Release 13), total 19 pages.

3GPP TS 36.304 V13.2.0 (Jun. 2016), 3rd Generation Partnership Project;Technical Specification Group Radio Access Network;Evolved Universal Terrestrial Radio Access (E-UTRA); User Equipment (UE) procedures in idle mode (Release 13), total 46 pages.

3GPP TS 36.321 V13.2.0 (Jun. 2016), 3rd Generation Partnership Project;Technical Specification Group Radio Access Network;Evolved Universal Terrestrial Radio Access (E-UTRA); Medium Access Control (MAC) protocol specification (Release 13), total 91 pages.

3GPP TS 36.323 V13.2.1 (Jun. 2016), 3rd Generation Partnership Project;Technical Specification Group Radio Access Network;Evolved Universal Terrestrial Radio Access (E-UTRA);Packet Data Convergence Protocol (PDCP) specification(Release 13), total 39 pages.

3GPP TS 36.331 V13.2.0 (Jun. 2016), 3rd Generation Partnership Project;Technical Specification Group Radio Access Network;Evolved Universal Terrestrial Radio Access (E-UTRA);Radio Resource Control (RRC);Protocol specification (Release 13), total 621 pages.

COMMUNICATION METHOD AND COMMUNICATIONS APPARATUS

CROSS-REFERENCE TO RELATED APPLICATIONS

This application is a continuation application of U.S. application Ser. No. 16/325,180, filed on Feb. 12, 2019, which is a national stage of International Application No. PCT/CN2016/095051, filed on Aug. 12, 2016. Both of the aforementioned applications are hereby incorporated by reference in their entireties.

TECHNICAL FIELD

The present invention relates to the field of communications device technologies, and in particular, to a communication method and a communications apparatus.

BACKGROUND

The RAN1 work group of the 3GPP (3rd Generation Partnership Project, 3rd Generation Partnership Project) organization initiated standardization work of the LTE (Long Term Evolution, Long Term Evolution) system-based Internet of Vehicles in August 2015. A scope of research includes V2V (Vehicle to Vehicle, Vehicle to Vehicle) communication, V2P (Vehicle to Pedestrian) communication, and V2I (Vehicle to Infrastructure) communication, which are collectively referred to as V2X (Vehicle to Everything, that is, LTE-V). The V2X technology may be implemented based on a sidelink (sidelink) interface, or may be implemented based on a Uu interface (an interface between UE (User Equipment) and a UTRAN (UMTS Terrestrial Radio Access Network)). At present, the RAN1 work group mainly conducts standardization work for the sidelink interface-based V2V. The sidelink interface-based V2V is a technology evolved from LTE-D2D (Device to Device, Device to Device) communication, and is an optimization specific to in-vehicle terminal requirements, such as a faster movement speed, a smaller latency, and higher reliability. To meet a reliability requirement in a future unmanned driving scenario, the 3GPP SA1 work group proposes technical requirements oriented to 5G Internet of Vehicles, including that a 3GPP system needs to: (1) support an end-to-end latency of 1 ms; (2) support nearly 100% reliability; and (3) support ultra-high vehicle density, for example, there may be more than 10,000 vehicles within a given range.

In V2V communication, resources for sending signals by in-vehicle terminals (UE, User Equipment) use a frequency division multiplexing manner in terms of frequency domain. Therefore, a plurality of in-vehicle terminals are allowed to send V2V signals simultaneously in a same subframe. Current UE cannot receive and transmit a signal simultaneously on one carrier. In this case, there is a half-duplex constraint problem. That is, UE that sends a signal in a subframe cannot discover or detect another UE in the subframe. In other words, transmit-end UEs in the subframe cannot discover or detect each other. The same problem also exists in a D2D communications system. For UEs, V2V messages of some UEs are not detected due to the half-duplex constraint problem, thereby affecting detection reliability.

In the prior art, in a D2D system, the half-duplex constraint problem is resolved through time-frequency hopping. A D2D resource is divided into a plurality of periods in terms of time, and each UE has one transmission opportunity for transmitting a D2D signal in each period. After time-frequency hopping, different UEs perform transmission in different subframes, so that the UEs can discover each other.

However, in the foregoing time-frequency hopping solution, UEs that send signals in a specific subframe of a specific period still cannot discover each other. Therefore, a discovery latency exists, and duration of the latency depends on duration of the period.

The 5G Internet of Vehicles technology for an unmanned driving application requires higher reliability and is more latency-sensitive. Therefore, the prior art cannot meet a 5G-oriented technical requirement proposed by the SA1 work group of the 3GPP organization.

SUMMARY

Embodiments of the present invention provide a communication method and a communications apparatus, to implement message sending on a plurality of carriers.

According to a first aspect, the present invention provides a communication method. The method includes: determining, by a network-side device, a resource configuration policy, where the resource configuration policy includes that the network-side device configures a plurality of carriers for inter-terminal communication and one or more resource pools are configured for each of the plurality of carriers; determining, by the network-side device, an operation mode of a terminal based on the resource configuration policy, where the operation mode is used to instruct the terminal to perform sending on one or more resource pools of the plurality of carriers; and broadcasting information about the configured plurality of resource pools and the operation mode, so that the terminal sends information based on the configured plurality of resource pools, and determining, based on the operation mode, that the terminal sends the information on a plurality of resource units of the one or more resource pools. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

In a possible design, the method further includes: receiving, by the network-side device, usage statuses of the plurality of resource pools sent by the terminal, where a usage status of a resource pool includes a usage proportion of the resource pool; and determining, by the network-side device, whether to adjust the resource pool based on the received usage proportion of the resource pool. A usage status of a current resource pool is determined based on a message sent by the terminal on the resource pool. This avoids a problem that a plurality of terminals cannot send information normally on the resource pool due to the excessively small resource pool.

In a possible design, the operation mode determined by the network-side device may be a first mode, and the first mode is used to indicate whether the terminal is allowed to send a message on at least one carrier within one time interval. By using the first mode, the terminal can perform sending on a plurality of carriers and perform receiving on the plurality of carriers, thereby increasing a probability that information sent by the terminal is received.

In a possible design, that the first mode is used to indicate whether the terminal is allowed to send a message on at least one carrier within one time interval specifically includes: determining, based on a priority of the terminal, a priority of a terminal service, a probability of sending a message on the plurality of carriers by the terminal, or a resource unit occupied in a resource pool by the terminal to listen to another terminal, whether the terminal is allowed to send the message on a resource unit of the at least one carrier. By using a plurality of different modes, information sent by the terminal can be configured for a plurality of carriers according to different rules, so as to improve information sending reliability of the terminal.

In a possible design, the operation mode determined by the network-side device may be a second mode, and the second mode is used to indicate whether the terminal is allowed to receive a message on one of the plurality of carriers for a plurality of times, or receive a message on each of the plurality of carriers for one or more times. By using the second mode, a terminal can occupy a plurality of resource units on one or more of a plurality of carriers to send information, and another terminal can receive, on each of the one or more of the plurality of carriers, the information sent by the terminal. This improves information sending and information receiving accuracy of a device.

In a possible design, for one or more of the plurality of carriers, whether the terminal is allowed to send a message on a resource unit of a resource pool may be determined based on any one of a priority of the terminal, a priority of a terminal service, a probability of sending a message on the plurality of carriers by the terminal, or a resource unit occupied in a resource pool by the terminal to listen to another terminal. By using a plurality of different modes, information sent by the terminal can be configured for a plurality of carriers according to different rules, so as to improve information sending reliability of the terminal.

In a possible design, the operation mode determined by the network-side device may be a third mode, and the third mode is used to indicate whether the terminal is allowed to send a message on one of the plurality of carriers. By using the third mode, the terminal can send a message on one carrier, and can receive a message on a plurality of carriers.

In a possible design, that the third mode is used to indicate whether the terminal is allowed to send a message on one of the plurality of carriers specifically includes: determining, based on one of a priority of the terminal, a priority of a terminal service, a probability of sending a message on the plurality of carriers by the terminal, or a resource unit occupied in a resource pool by the terminal to listen to another terminal, whether the terminal is allowed to send the message on a resource unit of the one of the plurality of carriers. By using a plurality of different modes, information sent by the terminal can be configured for a plurality of carriers according to different rules, so as to improve information sending reliability of the terminal.

According to another aspect, an embodiment of the present invention provides a communication method. The method includes: receiving, by a terminal, a resource configuration policy and an operation mode, where the resource configuration policy includes that a network-side device configures a plurality of carriers for inter-terminal communication and a plurality of resource pools are configured for each carrier, and the operation mode is used to instruct the terminal to perform sending on one or more resource pools of the plurality of carriers; and sending a to-be-sent message on one or more resource units of each of the plurality of carriers based on the operation mode. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

In a possible design, the method further includes: sending, by the terminal, a usage status of a resource pool to the network-side device, where the usage status of resource pool is determined based on a message sent by another terminal and received by the terminal, and the usage status of the resource pool includes a usage proportion of the resource pool, so that the network-side device determines whether to adjust the resource pool based on the usage proportion of the resource pool. A usage status of a current resource pool is determined based on a message sent by the terminal on the resource pool. This avoids a problem that a plurality of terminals cannot send information normally on the resource pool due to the excessively small resource pool.

In a possible design, the operation mode received by the terminal may be a first mode, and the first mode is used to indicate whether the terminal is allowed to send a message on at least one carrier within one time interval. By using the first mode, the terminal can perform sending on a plurality of carriers and perform receiving on the plurality of carriers, thereby increasing a probability that information sent by the terminal is received.

In a possible design, that the first mode is used to indicate whether the terminal is allowed to send a message on at least one carrier within one time interval specifically includes: determining, based on one of a priority of the terminal, a priority of a terminal service, a probability of sending a message on the plurality of carriers by the terminal, or a resource unit occupied in a resource pool by the terminal to listen to another terminal, whether the terminal is allowed to send the message on a resource unit of the at least one carrier. By using a plurality of different modes, information sent by the terminal can be configured for a plurality of carriers according to different rules, so as to improve information sending reliability of the terminal.

In a possible design, the operation mode received by the terminal may be a second mode, and the second mode is used to indicate whether the terminal is allowed to send a message on one of the plurality of carriers for one or more times, or send a message on each of the plurality of carriers for one or more times. By using the second mode, a terminal can occupy a plurality of resource units on one or more of a plurality of carriers to send information, and another terminal can receive, on each of the one or more of the plurality of carriers, the information sent by the terminal. This improves information sending and information receiving accuracy of a device.

In a possible design, for one or more of the plurality of carriers, whether the terminal receives or sends a message on a resource unit of a resource pool may be determined based on one of a priority of the terminal, a priority of a terminal service, a probability of sending a message on the plurality of carriers by the terminal, or a resource unit occupied in a resource pool by the terminal to listen to another terminal. By using a plurality of different modes, information sent by the terminal can be configured for a plurality of carriers according to different rules, so as to improve information sending reliability of the terminal.

In a possible design, the operation mode received by the terminal may be a third mode, and the third mode is used to indicate whether the terminal is allowed to send a message on one of the plurality of carriers. By using the third mode, the terminal can send a message on one carrier, and can receive a message on a plurality of carriers.

In a possible design, that the third mode is used to indicate whether the terminal is allowed to send a message on one of the plurality of carriers specifically includes: determining, based on one of a priority of the terminal, a priority of a terminal service, a probability of sending a message on the plurality of carriers by the terminal, or a resource unit occupied in a resource pool by the terminal to listen to another terminal, whether the terminal is allowed to send the message on a resource unit of the one of the plurality of carriers. By using a plurality of different modes, information sent by the terminal can be configured for a plurality of carriers according to different rules, so as to improve information sending reliability of the terminal.

According to a third aspect, an embodiment of the present invention provides a communication method. The method includes: determining, by a terminal, a multi-carrier operation mode and a resource pool, where the multi-carrier operation mode and the resource pool may be preconfigured, and the preconfigured multi-carrier operation mode includes any one or more of a first mode, a second mode, and a third mode, the first mode is used to indicate whether the terminal is allowed to send a message on at least one carrier within one time interval, the second mode is used to indicate whether the terminal is allowed to receive a message on one or more of a plurality of carriers for one or more times, and the third mode is used to indicate whether the terminal is allowed to send a message on one of the plurality of carriers; and sending, based on the operation mode, a message on one or more resource units of one or more resource pools. Through pre-configuration in the terminal, the terminal can send a message on a plurality of carriers when no signal coverage of a network-side device is available.

In a possible design, the determining, by a terminal, a multi-carrier operation mode and a resource pool is specifically: determining, by the terminal, the multi-carrier operation mode and the resource pool based on a pre-configuration when the terminal determines that the terminal is unable to communicate with a network-side device, or when the network-side device instructs the terminal to perform the determining based on the pre-configuration, or regardless of what condition the terminal is in. A first terminal receives a plurality of first messages sent by a plurality of terminals on a first carrier, where the first carrier is a carrier on which a first terminal sends the first message; determines, based on the received first messages, an operation mode used when the terminal sends the first message on the first carrier, where the operation mode is used to instruct the terminal to perform sending on one or more resource pools; and determines that none of the plurality of terminals broadcast the operation mode, and broadcasts the determined operation mode, so that the plurality of terminals send the first messages based on the operation mode broadcast by the first terminal. By using a terminal as a device for sending a synchronization signal, a plurality of terminals can determine an operation mode based on the synchronization signal, so that the operation modes of the plurality of terminals are the same.

In a possible design, the determining, based on the received first messages, an operation mode used when the terminal sends the first message on the first carrier specifically includes: determining, based on statistics information of the first message, the operation mode used when the terminal sends the first message on the first carrier, where the statistics information of the first message includes a quantity of terminals that send the first messages on the first carrier. Different operation modes are determined based on a quantity of terminals that send the first message, so that the operation modes are more targeted.

According to a fifth aspect, an embodiment of the present invention provides a communication method. The method includes: receiving, by a first unit, first messages on a first carrier, where the first messages are a plurality of first messages sent by a plurality of terminals on the first carrier; and sending a second message in a time division multiplexing manner or a frequency division multiplexing manner, where the sending a second message is sending the received plurality of first messages to the plurality of terminals, so that the plurality of terminals are able to receive first messages sent by all other terminals of the plurality of terminals on the first carrier; the time division multiplexing manner means that a time-frequency resource used for sending the second message by the first unit and a time-frequency resource used for the first message are grouped into separate resource pools in terms of time; and the frequency division multiplexing manner means that a time-frequency resource used for sending the second message by the first unit and a time-frequency resource used for the first message are grouped into separate resource pools in terms of frequency; and the separate resource pools grouped in terms of frequency may be resource pools on different carriers, or may be resource pools on a same carrier. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

In a possible design, the sending the received plurality of first messages to the plurality of terminals in the time division multiplexing manner or the frequency division multiplexing manner specifically includes: sending, by the first unit, a plurality of second messages to the plurality of terminals according to an instruction of a network-side device, or sending the second message to the plurality of terminals after receiving a forwarding request message sent by any of the plurality of terminals, or automatically forwarding, by the first unit, the received first messages to the plurality of terminals. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

In a possible design, the first unit detects a resource pool configured by a network-side device and receives an operation mode sent by the network-side device to the first unit, where the operation mode is an operation mode that forwarding is performed by using the first unit. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

According to a sixth aspect, an embodiment of the present invention provides a communication method. The method includes: configuring, by a network-side device, an operation mode and configuring a resource, where the operation mode is a mode that a message is received and forwarded by using a first unit, and the configuring a resource is allocating a resource pool, where the resource pool is a resource pool on a first carrier, and the resource pool on the first carrier is a resource pool that is available for inter-terminal communication; broadcasting the allocated resource pool, so that a plurality of terminals send first messages on the allocated resource pool of the first carrier, and the first unit receives the first messages sent by the plurality of terminals on the allocated resource pool of the first carrier; and sending the configured operation mode to the first unit, so that when the first unit detects that the plurality of terminals send the first messages on the resource pool of the first carrier, the first unit receives the first messages sent by the plurality of terminals on the resource pool of the first carrier, forwards the received first messages to the plurality of terminals on a second carrier, and/or forwards the received first messages to the plurality of terminals on a resource unit of the first carrier different from a resource unit occupied for the first messages. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

According to a seventh aspect, an embodiment of the present invention provides a network-side device, including: a processing unit, configured to determine a resource configuration policy, where the resource configuration policy includes that the network-side device configures a plurality of carriers for inter-terminal communication and one or more resource pools are configured for each of the plurality of carriers; and the processing unit is further configured to determine an operation mode of a terminal based on the resource configuration policy, where the operation mode is used to instruct the terminal to perform sending on one or more resource pools of the plurality of carriers; and a sending unit, configured to broadcast information about the configured one or more resource pools and the operation mode, so that the terminal performs sending based on the configured plurality of resource pools; and determine, based on the operation mode, that the terminal sends information on one or more resource units of the one or more resource pools. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

In a possible design, the network-side device further includes a receiving unit, configured to receive usage statuses of one or more resource pools sent by the terminal, where a usage status of a resource pool includes a usage proportion of the resource pool; and the processing unit is further configured to determine whether to adjust the resource pool based on the received usage proportion of the resource pool. A usage status of a current resource pool is determined based on a message sent by the terminal on the resource pool. This avoids a problem that a plurality of terminals cannot send information normally on the resource pool due to the excessively small resource pool.

In a possible design, the receiving unit is configured to receive usage statuses of the plurality of resource pools sent by the terminal, where a usage status of a resource pool includes a usage proportion of the resource pool; and the processing unit is further configured to determine whether to adjust the resource pool based on the received usage proportion of the resource pool. By using the first mode, the terminal can perform sending on a plurality of carriers and perform receiving on the plurality of carriers, thereby increasing a probability that information sent by the terminal is received.

In a possible design, that the first mode determined by the processing unit is used to indicate whether the terminal is allowed to send a message on at least one carrier within one time interval specifically includes: determining, based on any one of a priority of the terminal, a priority of a terminal service, a probability of sending a message on the plurality of carriers by the terminal, or a resource unit occupied in a resource pool by the terminal to listen to another terminal, whether the terminal is allowed to send the message on a resource unit of the at least one carrier. By using a plurality of different modes, information sent by the terminal can be configured for a plurality of carriers according to different rules, so as to improve information sending reliability of the terminal. By using the second mode, a terminal can occupy a plurality of resource units on one or more of a plurality of carriers to send information, and another terminal can receive, on each of the one or more of the plurality of carriers, the information sent by the terminal. This improves information sending and information receiving accuracy of a device.

In a possible design, the operation mode determined by the processing unit may be a second mode, and the second mode is used to indicate whether the terminal is allowed to receive a message on one of the plurality of carriers for one or more times, or receive and/or send a message on each of the plurality of carriers for one or more times. By using a plurality of different modes, information sent by the terminal can be configured for a plurality of carriers according to different rules, so as to improve information sending reliability of the terminal.

In a possible design, for any one or more of the plurality of carriers, whether the terminal is allowed to send a message on a resource unit of a resource pool may be determined based on any one of a priority of the terminal, a priority of a terminal service, a probability of sending a message on the plurality of carriers by the terminal, or a resource unit occupied in a resource pool by the terminal to listen to another terminal. By using the third mode, the terminal can send a message on one carrier, and can receive a message on a plurality of carriers.

In a possible design, the operation mode determined by the processing unit may be a third mode, and the third mode is used to indicate whether the terminal is allowed to send a message on one of the plurality of carriers. By using the third mode, the terminal can send a message on one carrier, and can receive a message on a plurality of carriers.

In a possible design, that the third mode is used to indicate whether the terminal is allowed to send a message on one of the plurality of carriers specifically includes: determining, based on one of a priority of the terminal, a priority of a terminal service, a probability of sending a message on the plurality of carriers by the terminal, or a resource unit occupied in a resource pool by the terminal to listen to another terminal, whether the terminal is allowed to send the message on a resource unit of the one of the plurality of carriers. By using a plurality of different modes, information sent by the terminal can be configured for a plurality of carriers according to different rules, so as to improve information sending reliability of the terminal.

According to an eighth aspect, an embodiment of the present invention provides a terminal, including: a receiving unit, configured to receive a network deployment policy and an operation mode, where the network deployment policy includes that a network-side device configures a plurality of carriers for inter-terminal communication and one or more resource pools are configured for each carrier, and the operation mode is used to instruct the terminal to perform sending on one or more resource pools of the plurality of carriers; and a sending unit, configured to send a to-be-sent message on one or more resource units of the plurality of carriers based on the operation mode. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

In a possible design, the sending unit is further configured to send a usage status of a resource pool to the network-side device, where the usage status of the resource pool is determined based on a message sent by another terminal and received by the terminal, and the usage status of the resource pool includes a usage proportion of the resource pool, so that the network-side device determines whether to adjust the resource pool based on the usage proportion of the resource pool. A usage status of a current resource pool is determined based on a message sent by the terminal on the resource pool. This avoids a problem that a plurality of terminals cannot send information normally on the resource pool due to the excessively small resource pool.

In a possible design, the operation mode received by the receiving unit may be a first mode, and the first mode is used to indicate whether the terminal is allowed to send a message on at least one carrier within one time interval. By using the first mode, the terminal can perform sending on a plurality of carriers and perform receiving on the plurality of carriers, thereby increasing a probability that information sent by the terminal is received.

In a possible design, that the first mode received by the receiving unit is used to indicate whether the terminal is allowed to send a message on at least one carrier within one time interval specifically includes: determining, based on any one of a priority of the terminal, a priority of a terminal service, a probability of sending a message on the plurality of carriers by the terminal, or a resource unit occupied in a resource pool by the terminal to listen to another terminal, whether the terminal is allowed to send the message on a resource unit of the at least one carrier. By using a plurality of different modes, information sent by the terminal can be configured for a plurality of carriers according to different rules, so as to improve information sending reliability of the terminal.

In a possible design, for a plurality of the plurality of carriers, whether the terminal is allowed to receive or send a message on a resource unit of a resource pool may be determined based on any one of a priority of the terminal, a priority of a terminal service, a probability of sending a message on the plurality of carriers by the terminal, or a resource unit occupied in a resource pool by the terminal to listen to another terminal. By using the second mode, a terminal can occupy a plurality of resource units on one or more of a plurality of carriers to send information, and another terminal can receive, on each of the one or more of the plurality of carriers, the information sent by the terminal. This improves information sending and information receiving accuracy of a device.

In a possible design, for one or more of the plurality of carriers, whether the terminal receives or sends a message on a resource unit of a resource pool may be determined based on a priority of the terminal, a priority of a terminal service, a probability of sending a message on the plurality of carriers by the terminal, or a resource unit occupied in a resource pool by the terminal to listen to another terminal. By using a plurality of different modes, information sent by the terminal can be configured for a plurality of carriers according to different rules, so as to improve information sending reliability of the terminal.

In a possible design, the operation mode received by the receiving unit may be a third mode, and the third mode is used to indicate whether the terminal is allowed to send a message on one of the plurality of carriers. By using the third mode, the terminal can send a message on one carrier, and can receive a message on a plurality of carriers.

In a possible design, that the third mode is used to indicate whether the terminal is allowed to send a message on one of the plurality of carriers specifically includes: determining, based on any one of a priority of the terminal, a priority of a terminal service, a probability of sending a message on the plurality of carriers by the terminal, or a resource unit occupied in a resource pool by the terminal to listen to another terminal, whether the terminal is allowed to send the message on a resource unit of the one of the plurality of carriers. By using a plurality of different modes, information sent by the terminal can be configured for a plurality of carriers according to different rules, so as to improve information sending reliability of the terminal.

According to a ninth aspect, an embodiment of the present invention provides a terminal, including: a processing unit, configured to determine a multi-carrier operation mode and a resource pool, where the multi-carrier operation mode and the resource pool may be preconfigured, and the preconfigured multi-carrier operation mode includes any one or more of a first mode, a second mode, and a third mode, the first mode is used to indicate whether the terminal is allowed to send a message on at least one carrier within one time interval, the second mode is used to indicate whether the terminal is allowed to receive a message on one or more of a plurality of carriers for one or more times, and the third mode is used to indicate whether the terminal is allowed to send a message on one of the plurality of carriers; and a sending unit, configured to transmit a message on one or more resource units of a plurality of resource pools. Through pre-configuration in the terminal, the terminal can send a message on a plurality of carriers when no signal coverage of the network-side device is available.

In a possible design, that the processing unit determines a multi-carrier operation mode and a resource pool is specifically: determining, by the terminal, the multi-carrier operation mode and the resource pool based on a pre-configuration, when the terminal determines that the terminal is unable to communicate with a network-side device, or when a network-side device instructs the terminal to perform the determining based on the pre-configuration. By using a terminal as a device for sending a synchronization signal, a plurality of terminals can determine an operation mode based on the synchronization signal, so that the operation modes of the plurality of terminals are the same.

According to a tenth aspect, a specific embodiment of the present invention provides a terminal, including: a receiving unit, configured to receive a plurality of first messages sent by a plurality of terminals on a first carrier, where the first carrier is a carrier on which a first terminal sends the first message; a processing unit, configured to determine, based on the received first messages, an operation mode used when the terminal sends the first message on the first carrier, where the operation mode is used to instruct the terminal to perform sending on one or more resource pools; and determining, by the first terminal, that none of the plurality of terminals broadcast the operation mode, and broadcasting the determined operation mode, so that the plurality of terminals send the first messages based on the operation mode broadcast by the first terminal. Different operation modes are determined based on a quantity of terminals that send the first message, so that the operation modes are more targeted.

In a possible design, that the processing unit determines, based on the received first messages, an operation mode used when the terminal sends the first message on the first carrier specifically includes: determining, based on statistics information of the first message, the operation mode used when the terminal sends the first message on the first carrier, where the statistics information of the first message includes a quantity of terminals that send the first messages on the first carrier. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

According to an eleventh aspect, an embodiment of the present invention provides a first unit, including: a receiving unit, configured to receive first messages on a first carrier, where the first messages are a plurality of first messages sent by a plurality of terminals on the first carrier; and a sending unit, configured to send a second message in a time division multiplexing manner or a frequency division multiplexing manner, where the sending a second message is sending the received plurality of first messages to the plurality of terminals, so that the plurality of terminals are able to receive first messages sent by all other terminals of the plurality of terminals on the first carrier; the time division multiplexing manner means that a time-frequency resource used for sending the second message by the first unit and a time-frequency resource used for the first message are grouped into separate resource pools in terms of time; and the frequency division multiplexing manner means that a time-frequency resource used for sending the second message by the first unit and a time-frequency resource used for the first message are grouped into separate resource pools in terms of frequency; and the separate resource pools grouped in terms of frequency may be resource pools on different carriers, or may be resource pools on a same carrier. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

In a possible design, that the sending unit sends the received plurality of first messages to the plurality of terminals in the time division multiplexing manner or the frequency division multiplexing manner specifically includes: sending, by the first unit, a plurality of second messages to the plurality of terminals according to an instruction of a network-side device, or sending the second message to the plurality of terminals after receiving a forwarding request message sent by any of the plurality of terminals, or automatically forwarding, by the first unit, the received first messages to the plurality of terminals. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

In a possible design, the receiving unit is further configured to detect a resource pool configured by a network-side device and receive an operation mode sent by the network-side device to the first unit, where the operation mode is an operation mode that forwarding is performed by using the first unit. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

According to a twelfth aspect, an embodiment of the present invention provides a network-side device, including: a processing unit, configured to configure an operation mode and configure a resource, where the operation mode is a mode that a message is received and forwarded by using a first unit, and the configuring a resource is allocating a resource pool, where the resource pool is a resource pool on a first carrier, and the resource pool on the first carrier is a resource pool that is available for inter-terminal communication; and a sending unit, configured to broadcast the allocated resource pool, so that a plurality of terminals send first messages on the allocated resource pool of the first carrier, and the first unit receives the first messages sent by the plurality of terminals on the allocated resource pool of the first carrier; and send the configured operation mode to the first unit, so that when the first unit detects that the plurality of terminals send the first messages on the resource pool of the first carrier, the first unit receives the first messages sent by the plurality of terminals on the resource pool of the first carrier, forwards the received first messages to the plurality of terminals on a second carrier, and/or forwards the received first messages to the plurality of terminals on a resource unit of the first carrier different from a resource unit occupied for the first messages. This avoids a problem that a terminal cannot receive a message sent by another terminal device due to a half-duplex constraint among a plurality of terminals, reduces a latency in receiving a message sent by the another terminal device, and meets a technical requirement for 5G-oriented Internet of Vehicles.

The specific embodiments of the present invention provide a communication method and a communications apparatus. One or more resource pools are configured for one or more carriers for inter-terminal communication, so that a terminal can send a message on the one or more resource pools of the plurality of carriers. This avoids a problem that a terminal cannot receive a message sent by another terminal device due to a half-duplex constraint among a plurality of terminals, reduces a latency in receiving a message sent by the another terminal device, and meets a 5G-oriented technical requirement.

DESCRIPTION OF EMBODIMENTS

The technical solutions in embodiments of the present invention are further described in detail with reference to accompanying drawings and embodiments as follows.

The following detailed descriptions describe various features and functions of the system and the method disclosed with reference to the accompanying drawings. In the accompanying drawings, unless otherwise specified in the context, similar symbols identify similar components. The descriptive system and method embodiments described in this specification are not intended to impose a limitation. It is easily understood that some aspects of the disclosed system and method may be arranged and combined according to various different configurations, and all these are covered in this specification.

Figure 1:
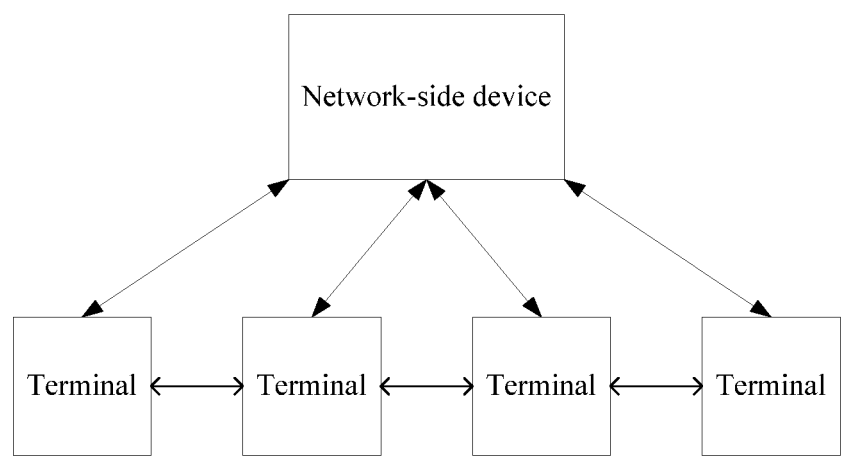
FIG. 1 is a system architecture diagram of a terminal communications system according to an embodiment of the present invention.

FIG. 1 is a system architecture diagram of a terminal communications system according to an embodiment of the present invention. As shown in FIG. 1, a plurality of terminals 101 and a network-side device 102 are included. It should be understood that the disclosed method can be applied to any quantity of different devices. The terminals 101 and the network-side device 102 are merely examples of a specific embodiment of the present invention, and the method is not specifically limited to an operating environment shown herein. In this specific embodiment of the present invention, the network-side device may be a base station (Evolved NodeB, eNB), or may be another network device.

The terminal 101 may be an in-vehicle terminal, and may be implemented in a vehicle or in the form of a vehicle. However, the system in the example may be implemented in another vehicle or in the form of another vehicle, such as a car, a truck, a motorcycle, a bus, a ship, an aircraft, a helicopter, a cropper, a snow cleaner, a van, a vehicle in an amusement park, agricultural equipment, construction equipment, a tramcar, a golf cart, a train, or a tram. In addition, a robotic apparatus or a terminal (UE) in another form, such as a handheld terminal, may also be used to execute the method and system described herein.

The terminal 101 further includes a message communication unit. The message communication unit may be a device that is installed (embedded) by an OEM (Original Equipment Manufacturer, original equipment manufacturer) or a market available device. The message communication unit is installed in the terminal and can communicate with the network-side device, another terminal that enables message communication, or some other entities or devices. The message communication unit preferably uses radio broadcasting to establish a communication channel to a radio carrier system and/or another terminal that enables message communication, so that a message and/or transmitted data can be received on the channel by the another terminal and the network-side device.

The terminals 101 may directly communicate with each other with or without network assistance.

Figure 2:
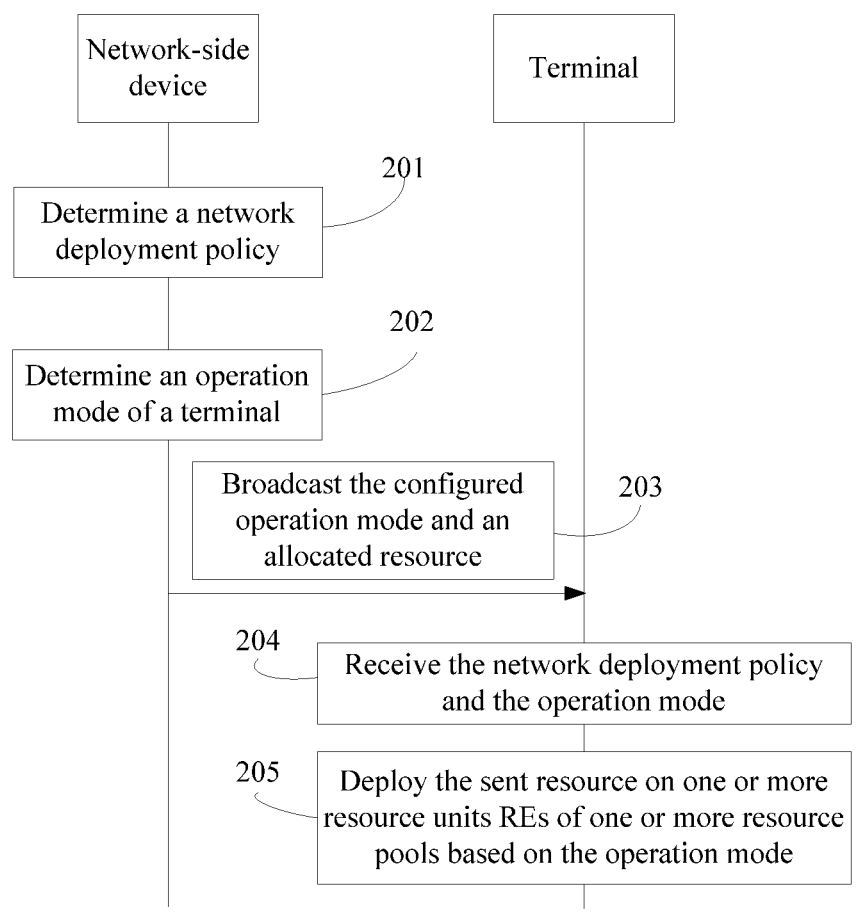
FIG. 2 is a signaling diagram of a communication method according to a specific embodiment of the present invention.

FIG. 2 is a signaling diagram of a communication method according to a specific embodiment of the present invention.

S201: A network-side device determines a resource configuration policy.

In this specific embodiment of the present invention, the resource configuration policy includes that the network-side device configures a plurality of carriers for inter-terminal communication and one or more resource pools are configured for each of the plurality of carriers. The carrier may be understood as a segment of frequency resources centering around a carrier frequency (carrier frequency), and signals are transmitted on the segment of frequency resources; or may be understood as a frequency band, and each frequency band is corresponding to one carrier. In the descriptions of the present invention, unless otherwise specified, a frequency band and a carrier have a same meaning.

A quantity of carriers supported by the network-side device is a quantity of radio wave frequency bands that can be configured by the network-side device. The quantity of carriers that can be configured by the network-side device may be related to a capability of the network-side device or a terminal. For example, if the network-side device or the terminal has only one radio frequency channel (Radio Frequency Chain, RF chain), a radio wave of only one frequency can be modulated at a time, and the network-side device or the terminal can send a signal only on a single carrier. The quantity of carriers supported by the network-side device may also be related to current settings of the network-side device. For example, a network-side device that has two radio frequency channels can perform transceiving on two carriers. During busy time, the network-side device needs to serve many devices. In this case, the network-side device performs transceiving simultaneously on the two carriers, enabling more stable data transmission for the devices being served. During idle time, the network-side device does not need to serve many devices. In this case, the network-side device performs transceiving on one carrier, to satisfy a requirement of the devices being served and reduce overheads. In addition, the carriers supported by the network-side device further include the following cases: A PLMN (Public Land Mobile Network, public land mobile network) to which the network-side device belongs configures one or more frequency bands on a plurality of carriers for inter-terminal communication. When a terminal is in coverage of the network-side device or the network, (1) the network-side device may send a control message on the frequency band or bands of the plurality of carriers to provide network assistance for inter-terminal communication; or (2) the network-side device may send a control message related to the carrier frequency band or bands on another carrier, to perform cross-carrier scheduling; in this case, the network-side device does not send or receive a message on the carrier frequency band or bands.

A resource pool is configured based on the resource configuration policy. The configuring a resource pool is allocating one or more resource pools for a carrier of inter-terminal communication.

The resource pool is a set of time and frequency resources. In an LTE system, a minimal time-frequency resource element (Resource Element) is defined as a time-frequency resource in duration of one OFDM symbol on one subcarrier. For a future communications system, a minimal resource element may be defined differently. Without loss of generality, the resource unit in the present invention means a time-frequency resource in a specific time segment and on a specific frequency band. If applied to the LTE system, the resource unit may include one or more resource elements. The resource pool in the present invention includes one or more resource units. The terminal may select a resource unit from the allocated resource pool to send a message, and the terminal may receive, on the allocated resource pool, a message sent by another terminal on a plurality of resource units. The resource pool is allocated to a plurality of terminals, and the plurality of terminals select, based on the allocated resource pool, one or more resource units from the resource pool to send data. When the network-side device deploys a plurality of resource pools, the terminal selects one or more resource units from each resource pool to send data.

S202: The network-side device determines an operation mode of a terminal.

The operation mode is used to instruct the terminal to perform sending and/or receiving on one or more resource units of a plurality of carriers. In other words, the terminal selects, from the resource pool based on the operation mode, different carriers, resource units at different locations on the different carriers, and/or different quantities of resource units for data sending.

In this specific embodiment of the present invention, the network-side device may include one operation mode or a plurality of operation modes. The plurality of operation modes include a first mode, a second mode, and a third mode.

The first mode is used to indicate whether the terminal is allowed to transmit (Transmit, TX) a message on at least one carrier within one time interval, and/or is allowed to receive (Receive, RX) a message on at least one carrier. In this mode, the network-side device configures a plurality of carriers for inter-terminal communication, and each carrier has one or more resource pools. The network-side device, for example, an eNB, may send control signaling based on an operation policy, a resource usage status, a geographical location, a combination thereof, or the like, and configures (controls), by using the control signaling, whether to allow the terminal to send or receive a message on an allocated carrier. The control signaling may be sent in a broadcast message such as a system information block (System Information Block, SIB), or terminal-specific signaling such as an RRC (Radio Resource Control, radio resource control) message. The network-side device may perform configuration based on a terminal type or a service type, and the configuration includes one or more of the following cases:

(1) Terminals of different terminal types or different service types can perform sending/receiving on a same carrier or on different carriers.

(2) Terminals of different terminal types or different service types may perform sending/receiving on different quantities of carriers.

(3) A terminal may perform sending on a plurality of carriers, and may perform receiving on a plurality of carriers; a terminal may perform sending and receiving on a same carrier, or may perform sending and receiving on different carriers.

When a terminal is in a sending mode on a carrier, it indicates that the terminal may select a resource on the carrier to perform sending. When the terminal sends a message at a resource unit location on a particular carrier, the terminal cannot receive a message sent by another terminal within a time interval including the resource location.

When the terminal is in a receiving mode on a carrier, it indicates that the terminal may receive, on the carrier, a broadcast message sent by another terminal on the carrier.

Whether the terminal can be in the sending mode or the receiving mode on a carrier may be determined based on a configuration or a pre-configuration of the network-side device or a capability of the terminal.

That the terminal is in the receiving mode or the sending mode on a plurality of carriers may include a plurality of cases. For example, if the network-side device configures two carriers, based on a status of the terminal and/or a network configuration, the terminal may be in the sending mode on both carriers; or in the sending mode on a carrier 1 and in the receiving mode on a carrier 2; or in the receiving mode on a carrier 1 and in the sending mode on a carrier 2; or in the receiving mode on both carriers.

In an example, the terminal may have a plurality of different priorities, and a terminal priority may be determined based on a type of a message sent by the terminal and/or a priority of the terminal itself. A type of a service sent by the terminal includes a periodic service and an event-triggered service. The periodic service may be a regularly reported message about a current terminal status, and the event-triggered service is an abnormal message sent by the terminal. For example, the event-triggered service may be a message sent by the terminal in the case of a failure, or the like. For example, the event-triggered service has a higher priority than the periodic service. The priorities of different terminals may be classified based on usage types of the terminals. For example, an ambulance, a bus, and a private car have different priorities. For example, the ambulance has a higher priority than the bus, and the bus has a higher priority than the private car.

According to the foregoing, if in the operation mode determined by the network-side device, a terminal priority is determined based on service priorities and priorities of different terminals, the priority is determined based on weights of different terminals and different message types. For example, a priority weight of the event-triggered service is 10, a priority weight of the periodic service is 1, a priority weight of the ambulance is 7, a priority weight of the bus is 5, and a priority weight of the private car is 3. A priority of each service type of each terminal is obtained by multiplying a weighted priority of the service type by a weighted priority of the terminal. Therefore, a priority for sending the periodic service by the ambulance is higher than a priority for sending the periodic service by the bus, and the priority for sending the periodic service by the bus is higher than a priority for sending the periodic service by the private car. Priorities for the event-triggered services by the ambulance, the bus, and the private car are higher than priorities for sending the periodic services by the ambulance, the bus, and the private car.

Figure 3:
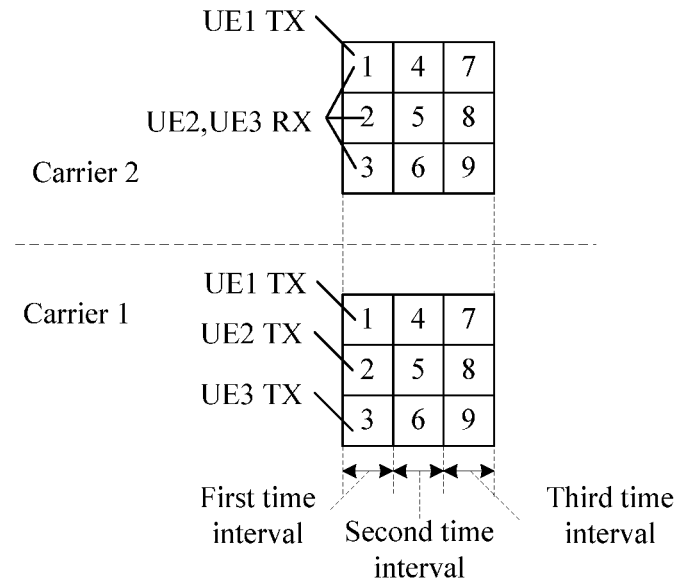
FIG. 3 shows examples of transceiving modes of UEs with different priorities on different carriers.

FIG. 3 shows examples of transceiving modes of UEs with different priorities on different carriers. As shown in FIG. 3, three terminals and resource pools of two carriers are included. The two carriers are a carrier 1 (Carrier 1) and a carrier 2 (Carrier 1). The carrier 1 and the carrier 2 each have a resource pool, and each resource pool includes nine resource units. The three terminals are UE1, UE2, and UE3.

The UE1 is a bus, and the UE2 and the UE3 are private cars. Messages sent by the UE1, the UE2, and the UE3 are periodic messages. Therefore, terminal priorities are: UE1>UE2=UE3. That is, two priorities are set. All UEs may send messages on the carrier 1 (Carrier 1) and the carrier 2 (Carrier 1).

The terminals perform configuration based on priorities of the terminals. The UE1, the UE2, and the UE3 are configured to send messages within a first time interval (1st interval) of the carrier 1. Only the UE1 configures to send a message within a first time interval of the carrier 2 (Carrier 2), while the UE2 and the UE3 can only receive messages on the carrier 2.

Therefore, the UE1, the UE2, and the UE3 cannot discover each other in the first time interval of the first carrier. In the first time interval of the carrier 2, the UE1 sends a message, and the UE2 and the UE3 receive the message sent by the UE1. Through combination of signals received on the two carriers, a probability that UE with a higher priority is detected correctly is increased to some extent, and reliability is improved correspondingly.

The foregoing example describes how to distinguish terminals based on priorities in the first mode according to this specific embodiment of the present invention. In another embodiment, how to configure the first mode in this specific embodiment of the present invention according to a probability based rule is described below.

In the plurality of resource pools of the configured carrier, a terminal may receive or send a message at a same probability, or may receive or send a message at different probabilities. In the case of a same probability, probabilities of sending or receiving a message by the terminal on a plurality of carriers are the same. For example, PTX (probability of receiving)=PRX (probability of transmission)=50%. In the case of different probabilities, probabilities of sending or receiving a message by the terminal on the plurality of carriers are different. For example, for two carriers, the PTX (probability of transmission) is 0.3 on one carrier, and the PTX (probability of transmission) is 0.7 on the other carrier.

Figure 4:
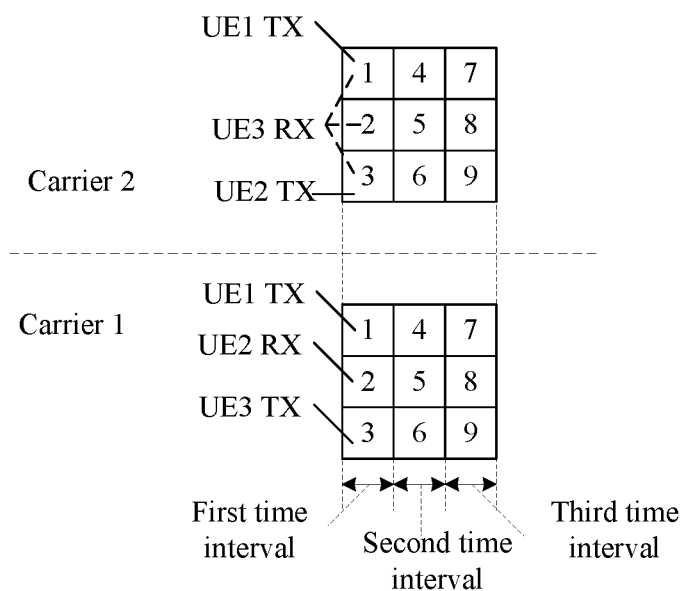
FIG. 4 shows a probability-based transceiving configuration of two carriers according to the present invention.

FIG. 4 shows a probability-based transceiving configuration of two carriers according to the present invention. As shown in FIG. 4, three terminals and resource pools of two carriers are included. The two carriers are a carrier 1 (Carrier 1) and a carrier 2 (Carrier 1). The carrier 1 and the carrier 2 each have a resource pool, and each resource pool includes nine resource units. The three terminals are UE1, UE2, and UE3.

It is assumed that the UE1, the UE2, and the UE3 each send or receive a message on the two carriers at a same probability. In other words, each UE may randomly select to send or receive a message on a carrier. For example, in a first time interval of the carrier 1, the UE1 and the UE3 send a message, and the UE2 receives the message; and in a first time interval of the carrier 2, the UE1 and the UE2 send a message, and the UE3 receives the message. It can be learned from the example that in the first time interval, the UE1 does not detect any message, the UE2 detects the UE1 and the UE3, and the UE3 detects the UE1 and the UE2.

A second mode is used to indicate whether a terminal is allowed to receive a message and/or send a message on one of a plurality of carriers for one or more times, or receive a message and/or send a message on each of a plurality of carriers for one or more times. In this way, the terminal can occupy a plurality of resource units in a resource pool, and sends information by using the plurality of resource units, so that another terminal can receive, at a higher probability, the information sent by the terminal. The sending a message for one or more times means sending messages with same content or messages of different redundancy versions obtained after same system information is encoded, and may be understood as retransmission. For a plurality of the plurality of carriers, whether the terminal is allowed to receive or send a message on a resource unit of a resource pool may be determined based on a priority of the terminal, a priority of a terminal service, a probability of sending a message on the plurality of carriers by the terminal, or a resource unit occupied in a resource pool by the terminal to listen to another terminal.

A quantity of resource elements occupied by the terminal on one carrier may be determined according to a configuration of the second mode. In an example, the second mode may specify that all terminals occupy, for example, two (one, three, four . . . ) resource units in each resource pool. The second mode may specify that different terminals occupy different quantities of resource units in the resource pool. For example, the terminal 1 may occupy one resource unit in a resource pool of the carrier 1 and two resource units in a resource pool of the carrier 2; and the terminal 2 may occupy one resource unit in the resource pool of the carrier 1 and one resource unit in the resource pool of the carrier 2.

That the terminal occupies different quantities of resource units in resource pools of different carriers may be determined according to a plurality of different rules, for example, according to a priority rule. The second mode determined by the network-side device further includes that after the terminal determines to occupy one or more resource units in a resource pool, the terminal determines a specific location of each resource unit in the resource pool. A specific location, determined by the network-side device in the second operation mode, of the terminal in a resource unit of the resource pool may be based on any one of priority-based resource selection, time-frequency hopping-based resource selection, or listening-based resource selection.

The priority-based resource selection includes two cases: a plurality of terminals have a same quantity of transmissions and have different quantities of transmissions.

Figure 5:
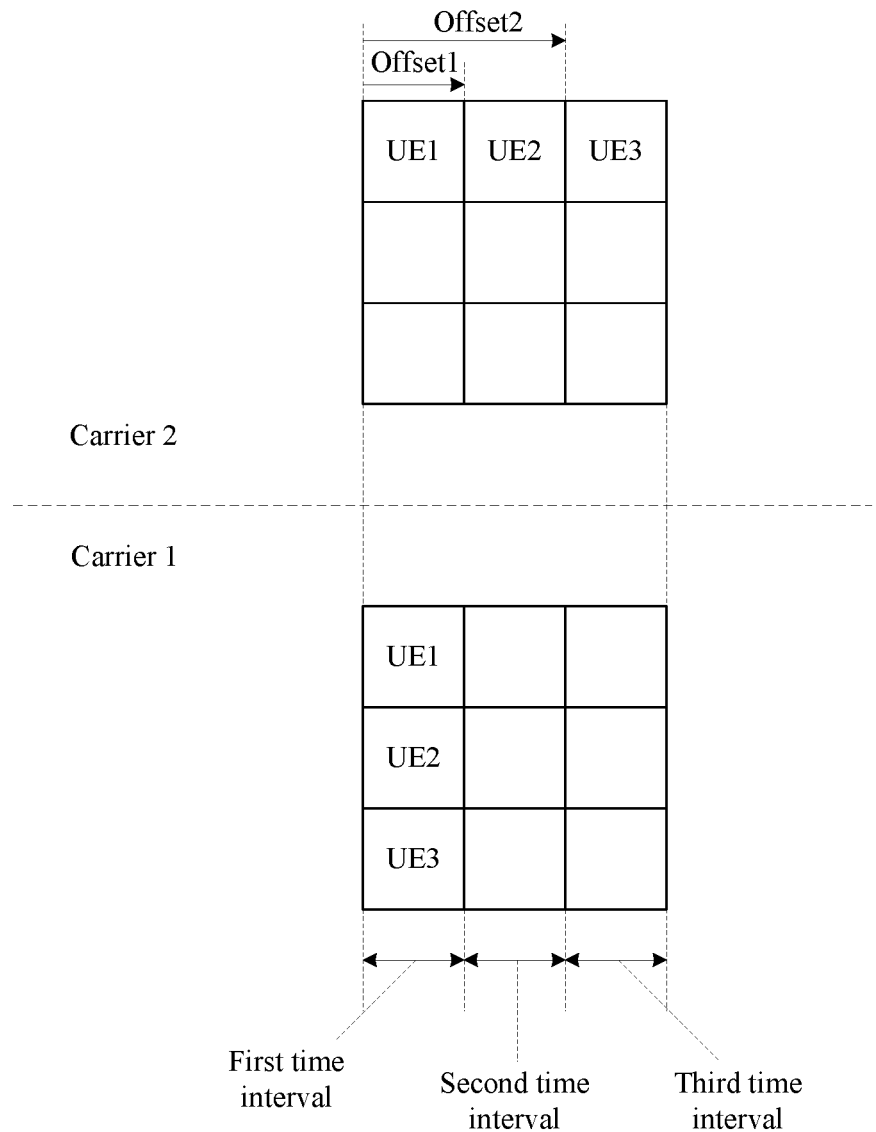
FIG. 5 shows a priority-based transceiving configuration of two carriers in the case of a same quantity of retransmissions according to a specific embodiment of the present invention.

It is assumed that a quantity of transmissions is 1 for each terminal. FIG. 5 shows a priority-based transceiving configuration of two carriers in the case of a same quantity of retransmissions according to a specific embodiment of the present invention. As shown in FIG. 5, three terminals and resource pools of two carriers are included. The two carriers are a carrier 1 (Carrier 1) and a carrier 2 (Carrier 1). The carrier 1 and the carrier 2 each include nine resource units. The three terminals are UE1, UE2, and UE3.

The UE1, the UE2, and the UE3 all have a fixed quantity of retransmissions, and the quantity of retransmissions is 1. Among the UEs shown in FIG. 5, a priority order is UE1>UE2>UE3. On the carrier 1, the UE1, the UE2, and the UE3 are all in a sending mode in a first time interval, while on the carrier 2, the UE1, the UE2, and the UE3 perform sending in different time intervals. The UE1, the UE2, and the UE3 in FIG. 5 perform sending at a same frequency location, and in actual application, may perform sending at other frequency locations. According to the priority order, on the carrier 2, a sending time offset of the UE1 is 0, a sending time offset of the UE2 is offset 1, and a sending time offset of the UE3 is offset 2. Therefore, after three time intervals, the UE1, the UE2, and the UE3 can discover each other on the carrier 2.

The quantity of retransmissions may be determined based on a priority of a terminal or a service priority of the terminal. Different quantities of retransmissions may be set for different priorities. For example, a quantity of retransmissions of a terminal or a service with a higher priority may be more than that of a terminal or a service with a lower priority.

Figure 6:
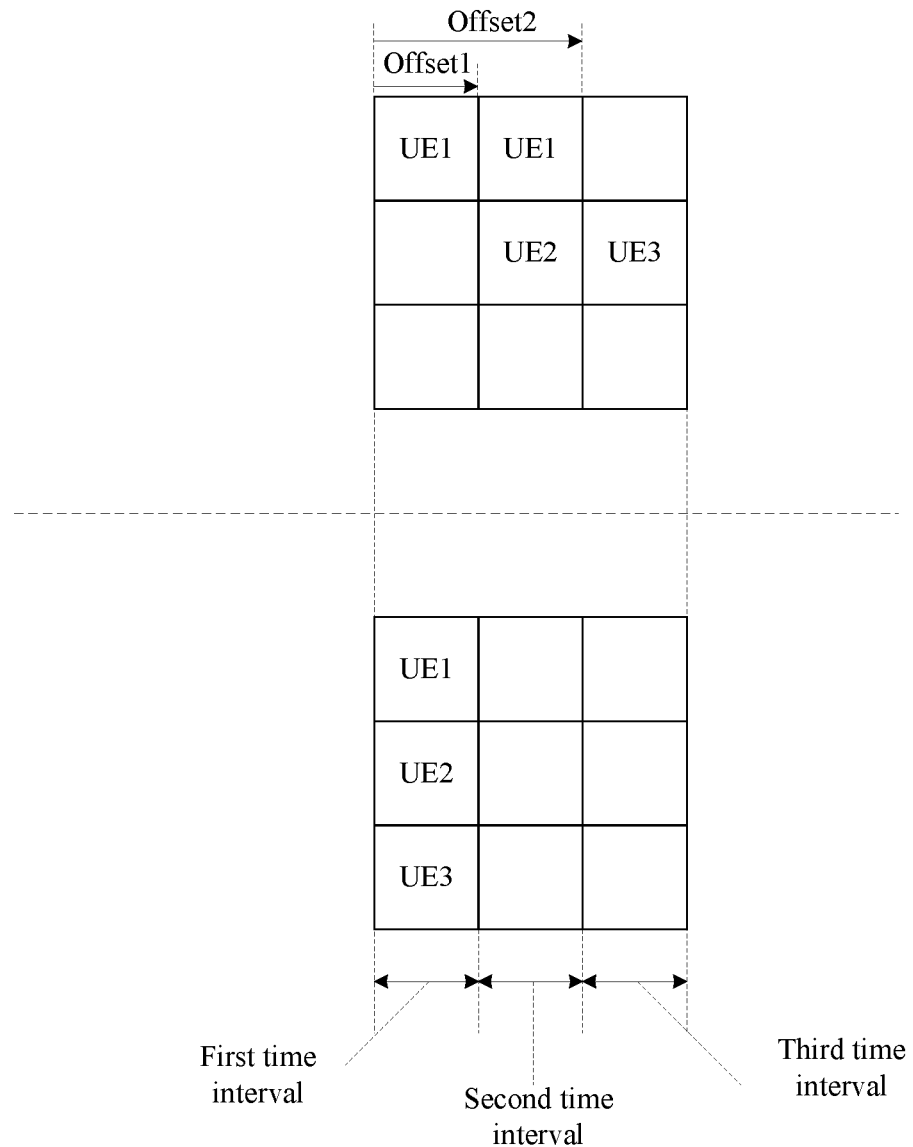
FIG. 6 shows a priority-based transceiving configuration of two carriers in the case of different quantities of retransmissions according to a specific embodiment of the present invention.

FIG. 6 shows a priority-based transceiving configuration of two carriers in the case of different quantities of retransmissions according to a specific embodiment of the present invention. As shown in FIG. 6, three terminals and resource pools of two carriers are included. The two carriers are a carrier 1 (Carrier 1) and a carrier 2 (Carrier 1). The carrier 1 and the carrier 2 each include nine resource units. The three terminals are UE1, UE2, and UE3, and two priorities are set for the three terminals. The UE1 has a first priority and a quantity of retransmissions is 2; and the UE2 and the UE3 have a second priority and a quantity of retransmissions is 1.

As shown in FIG. 6, on the carrier 1, the UE1, the UE2, and the UE3 are all in a sending mode within a first time interval. On the carrier 2, the UE1 has two retransmission opportunities, while the UE2 and the UE3 each have only one retransmission opportunity. The UE1, the UE2, and the UE3 perform sending based on different time offsets, but actually, they can perform sending at any available frequency location. According to a priority order, on the carrier 2, a sending time offset of the UE1 is 0, a sending time offset of the UE2 is offset 1, and a sending time offset of the UE3 is offset 2. Therefore, after three time intervals, on the carrier 2, the UE2 and the UE3 can discover the UE1, and the UE3 and the UE1 can discover each other. The UE1 with a larger quantity of retransmissions has a higher probability of being detected.

The time-frequency hopping-based resource selection includes two cases: a plurality of terminals have a same quantity of retransmissions and have different quantities of retransmissions.

Figure 7:
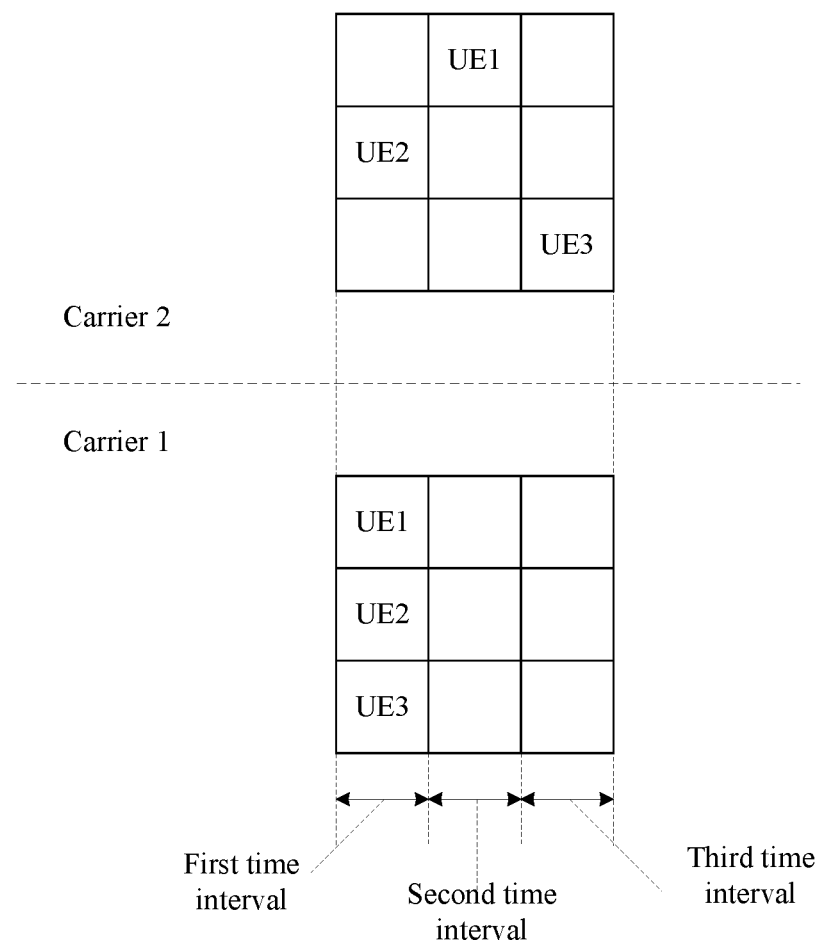
FIG. 7 shows a time-frequency hopping-based transceiving configuration of two carriers in the case of a same quantity of retransmissions according to a specific embodiment of the present invention.

In the case of a same quantity of retransmissions of each terminal, it is assumed that the quantity of retransmissions of each terminal is 1. FIG. 7 shows a time-frequency hopping-based transceiving configuration of two carriers in the case of a same quantity of retransmissions according to a specific embodiment of the present invention. As shown in FIG. 7, three terminals and resource pools of two carriers are included. The two carriers are a carrier 1 (Carrier 1) and a carrier 2 (Carrier 1). The carrier 1 and the carrier 2 each include nine resource units. The three terminals are UE1, UE2, and UE3.

Quantities of retransmissions of the UE1, the UE2, and the UE3 are all 1. The terminal selects a resource unit in the resource pool through random time-frequency hopping. On the carrier 1, the UE1, the UE2, and the UE3 are all in a sending mode within a first time interval. On the carrier 2, the UE1, the UE2, and the UE3 select resources in a time-frequency hopping manner and perform transmissions in different time intervals. After three time intervals, the UE1, the UE2, and the UE3 can discover each other on the carrier 2.

In the case of different quantities of retransmissions of each terminal, the quantity of retransmissions may be determined based on a priority of the terminal itself or a priority of a terminal service. For example, if there are two priorities, a terminal with a first priority performs two retransmissions, and a terminal with a second priority performs one retransmission. If there are three priorities, a terminal with a first priority performs three retransmissions, a terminal with a second priority performs two retransmissions, and a terminal with a third priority performs three retransmissions.

Figure 8:
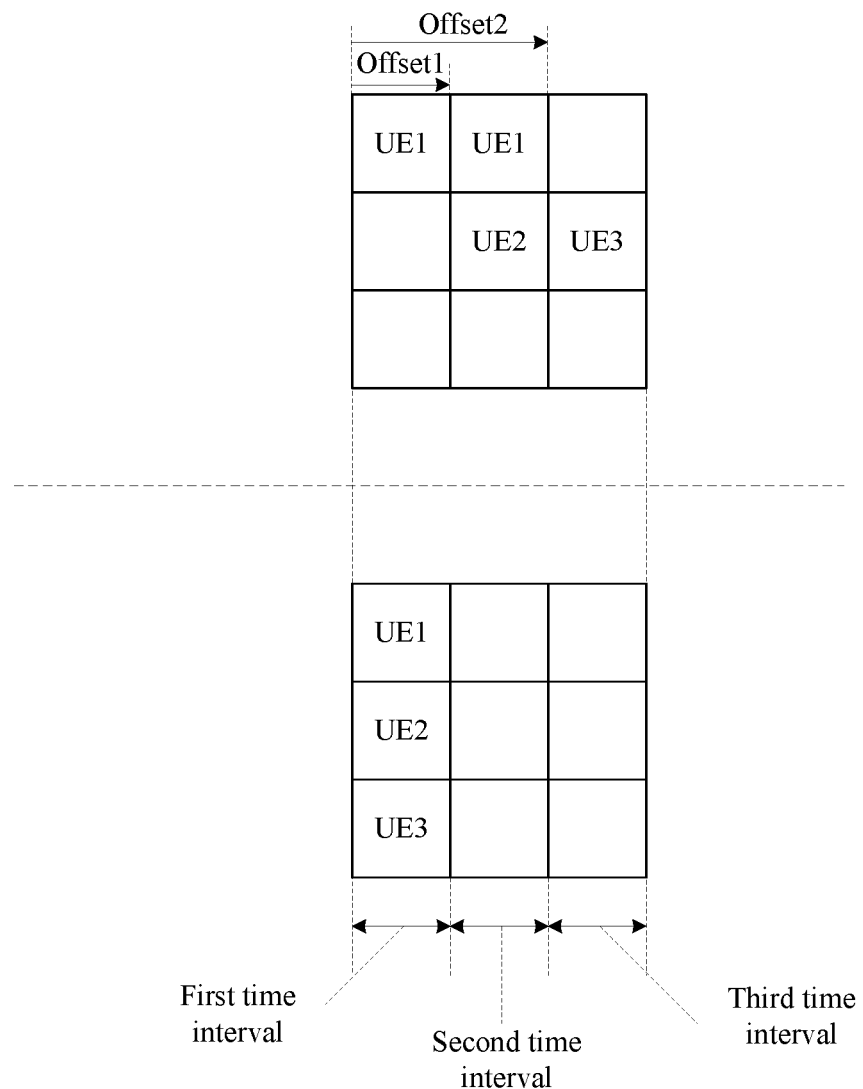
FIG. 8 shows a time-frequency hopping-based transceiving configuration of two carriers in the case of different quantities of retransmissions according to a specific embodiment of the present invention.

FIG. 8 shows a time-frequency hopping-based transceiving configuration of two carriers in the case of different quantities of retransmissions according to a specific embodiment of the present invention. As shown in FIG. 8, three terminals and resource pools of two carriers are included. The two carriers are a carrier 1 (Carrier 1) and a carrier 2 (Carrier 1). The carrier 1 and the carrier 2 each include nine resource units. The three terminals are UE1, UE2, and UE3, and two priorities are set for the three terminals. The UE1 has a first priority and a quantity of retransmissions is 2; and the UE2 and the UE3 have a second priority and a quantity of retransmissions is 1.

As shown in FIG. 8, each UE has a different quantity of transmissions and selects a resource based on time-frequency hopping. On the carrier 1, the UE1, the UE2, and the UE3 are all in a sending mode within a first time interval. On the carrier 2, the UE1 has two retransmission opportunities, the UE2 and the UE3 each have only one retransmission opportunity, and the UE1, the UE2, and the UE3 select, in a time-frequency hopping manner, resources for sending messages. After three time intervals, on the carrier 2, the UE1 and the UE2 can discover each other, and the UE2 and the UE3 can discover the UE1. The UE1 with a larger quantity of retransmissions has a higher probability of being detected.

A third mode is used to indicate whether the terminal is allowed to send a message on one of a plurality of carriers, and/or is allowed to receive a message on at least one of the plurality of carriers. A message is sent on one of the plurality of carriers and a message sent by another terminal is received on one or more of the plurality of carriers. In this way, different terminals can be allocated to different carriers, so that impact of a half-duplex constraint is reduced.

Whether the terminal is allowed to send a message on one of the plurality of carriers, and/or to receive a message on at least one carrier is determined based on a priority of the terminal, a priority of a terminal service, a probability of sending a message on the plurality of carriers by the terminal, or a resource unit occupied in a resource pool by the terminal to listen to another terminal. In this specific embodiment of the present invention, the foregoing rules are merely several specific examples of the specific implementations of the present invention, and are not intended to impose a limitation on the present invention.

For example, when a network-side device configures two carriers, terminals or services with different priorities (the terminals are classified based on a priority of a terminal type, a priority of a terminal service, a combination thereof, or the like) may be allocated to different carriers for sending messages, and two types of terminals may receive messages on one or both of the two carriers.

It should be noted that the first mode, the second mode, and the third mode are merely examples of some embodiments of a core idea of the present invention. Any communication between terminals by using a plurality of carriers, or any communication between terminals falls within the protection scope of the specific embodiments of the present invention.

The network-side device configures different multi-carrier operation modes based on different scenarios (such as a location, an available carrier resource, and the like). This is not limited in the present invention.

S203: Broadcast information about the configured operation mode and an allocated resource.

In this way, the terminal receives information about the configured resource pool and the operation mode, and sends information on the configured resource pool based on the operation mode.

After determining the operation mode and the allocated resource pool, the network-side device sends the information about the configured resource pool and the operation mode to the terminal. The network-side device may configure the operation mode by adding a plurality of bytes to a system message, for example, a SIB (System Information Blocks, SIB) message, so that the terminal can receive the information broadcast by the network-side device.

S204: The terminal receives the resource configuration policy and the operation mode.

The resource configuration policy received by the terminal includes that the network-side device configures a plurality of carries for inter-terminal communication and one or more resource pools are configured for each carrier. The operation mode received by the terminal is used to instruct the terminal to perform sending and/or receiving on one or more resource pools of the plurality of carriers.

S205: Send a to-be-sent message on one or more resource units of one carrier, or on one or more resource units of a plurality of carriers based on the operation mode.

Based on the resource pool broadcast by the network-side device and the operation mode sent by the network-side device, the terminal selects one or more resource units from resource units of a carrier to send information, or selects one or more resource units on some or all of the plurality of carriers to send information. Each terminal selects one or more resource pools, and selects one or more carriers from each resource pool based on a rule determined by the network-side device.

The terminal sends a message on a resource unit deployed with a resource, and receives a message on a resource unit not deployed with a resource.

The terminal sends a message on a selected resource unit of a resource pool, and receives, on an unselected resource unit of the resource pool, a message sent by another terminal in the same resource pool.

The terminal further sends a message received from another terminal to the network-side device. That the terminal sends a message received from another terminal to the network-side device includes sending a usage status of the resource pool by all terminals to the network-side device, so that the network-side adjusts the configured resource pool based on the current usage status of the resource pool. For example, when a usage of the resource pool is greater than a percentage, the network-side device adds resource units included in the resource pool, so that each terminal can send a message on an independent resource unit as much as possible, and another terminal can receive and demodulate the message. When the usage of the resource pool is less than a percentage, the network-side device reduces the resource units included in the resource pool, so that resources of the network-side device can be used more effectively and not wasted.

In this specific embodiment of the present invention, a plurality of operation modes are set for the terminal. The plurality of operation modes may be one or more of the operation modes in S202, and may be another method not mentioned in the present invention.

In a specific embodiment of the present invention, in addition to sending information based on the information broadcast by the base station, the terminal in this embodiment of the present invention may further set a preconfigured mode, and the terminal determines, based on the preconfigured mode, that the current multi-carrier operation mode used by the terminal is one of the plurality of multi-carrier operation modes configured for the terminal.

The preconfigured multi-carrier operation mode of the terminal includes the first mode, and/or the second mode, and/or the third mode. The first mode is used to indicate whether the terminal is allowed to send a message on at least one carrier within one time interval, and/or is allowed to receive a message on at least one carrier. The second mode is used to indicate whether the terminal is allowed to receive a message and/or send a message on one or more of the plurality of carriers for one or more times. The third mode is used to indicate whether the terminal is allowed to send a message on one of the plurality of carriers, and/or is allowed to receive a message on at least one carrier.

In an example, the preconfigured mode is to determine different multi-carrier operation modes for different terminals. For example, when there are a large quantity of terminals in a region, a priority-based concurrent transceiving mode is used to ensure that data of a terminal with a high priority can be sent first. When there are a small quantity of terminals in a region, a probability-based concurrent transceiving mode is used, so that probabilities of transmission on a plurality of carriers are the same among a plurality of terminals, thereby ensuring data transmission fairness among the terminals.

In an example, when the terminal is not within coverage of the network-side device, the terminal performs communication in the preconfigured mode. In another case of the present invention, when the network-side device instructs the terminal to use the preconfigured mode, the terminal uses the preconfigured mode for operation.

In another specific embodiment of the present invention, there are a plurality of terminals in a region outside coverage of the network-side device. Any one of the plurality of terminals, for example, a first terminal, receives a first message sent by another terminal of the plurality of terminals on a first carrier. The first terminal determines an operation mode based on the first message sent by the plurality of terminals on the first carrier.

The first terminal determines, based on statistics information of the first message, an operation mode used when the terminal sends the first message on the first carrier, where the statistics information of the first message includes a quantity of terminals that send the first messages on the first carrier. For example, when a percentage of the quantity of terminals that send the first messages on the first carrier to a quantity of resource units included in the first carrier exceeds a percentage, a priority-based operation mode is used to ensure that the first message sent by a terminal with a higher priority can be received. When a percentage of the quantity of terminals that send a plurality of first messages on the first carrier to the quantity of resource units included in the first carrier is less than a percentage, a probability-based operation mode is used, to ensure fairness of sending messages by all terminals on the first carrier, so that all terminals have equal opportunities to send the first message on the first carrier. In this specific embodiment of the present invention, the determining different operation modes based on the percentage of sending of the first message on the first carrier is merely an example of a specific implementation of the present invention, and is not intended to impose a limitation on the present invention. Any determining different operation modes based on the percentage of the quantity of the plurality of terminals that send the first messages on the first carrier to the quantity of resource units included in the first carrier shall fall within the protection scope of the present invention.

When the terminal sends a message on a plurality of resource pools, configured or preconfigured by the network-side device, on a plurality of carriers, cyclic prefixes (Cyclic shift Prefix, CP) with different time lengths may be set for messages sent on different resource pools. For example, a first cyclic prefix is used for a first resource pool, and a second cyclic prefix is used for a second resource pool.

After determining the operation mode, the first terminal further sends a synchronization signal, where the synchronization signal includes the operation mode determined by the first terminal. Another device of the plurality of terminals receives the synchronization signal, and determines, based on the synchronization signal, the current operation mode that a message is sent on the first carrier. That the first terminal sends the synchronization signal is adding the message to a broadcast channel (such as a PSBCH).

Before sending the synchronization signal, the first terminal further receives a synchronization signal sent by another terminal. If the first terminal receives the synchronization signal sent by the another terminal, and precision of the received synchronization signal is higher than or equal to precision of the synchronization message to be sent by the first terminal, the first terminal does not send the synchronization signal. If the first terminal cannot receive the synchronization signal sent by the another terminal, or the precision of the received synchronization signal is lower than the precision of the synchronization signal to be sent by the first terminal, the first terminal sends the synchronization signal. In this specific embodiment of the present invention, the precision of the synchronization signal of the terminal may be, for example, a GNSS (Global Navigation Satellite System, Global Navigation Satellite System) based synchronization precision, and is higher than a UE-based synchronization precision.

Figure 9:
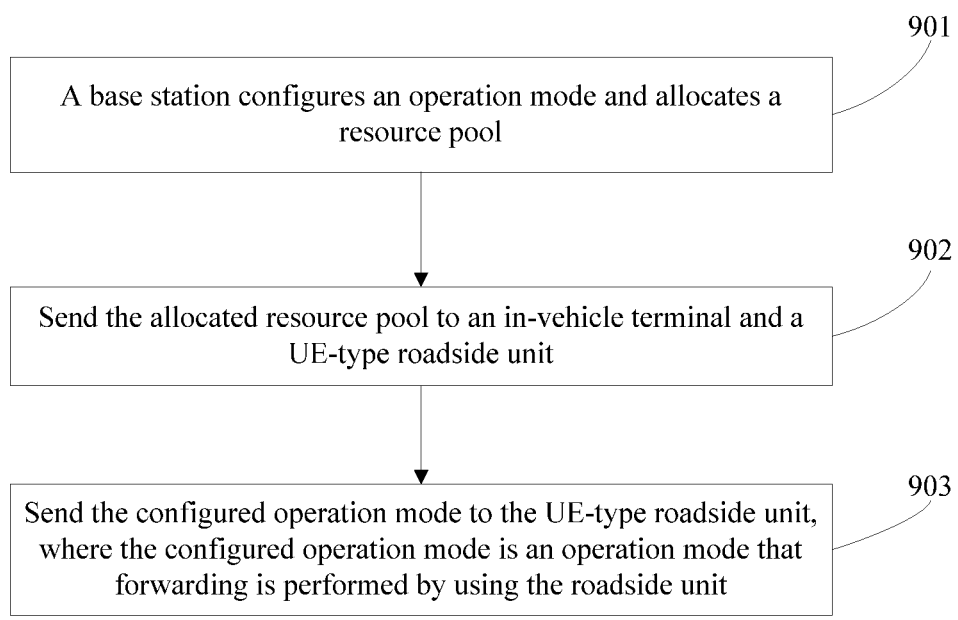
FIG. 9 is a schematic structural diagram of a forwarding method according to a specific embodiment of the present invention.

FIG. 9 is a schematic structural diagram of a forwarding method according to a specific embodiment of the present invention. As shown in FIG. 9, a terminal, a first unit, and a network-side device are included.

S901: The network-side device configures an operation mode and configures a resource.

In this specific embodiment of the present invention, the operation mode is an operation mode that a message is received and forwarded by using the first unit.

The configuring a resource is allocating a resource pool, and the allocating a resource pool is allocating resource pools with a quantity corresponding to a quantity of terminals to a first carrier, so that a plurality of terminals can send a message on the allocated resource pools of the first carrier, without causing waste of resource pools. The first carrier is a carrier used for communication between terminal devices.

S902: Broadcast the configured operation mode and a resource configuration result.

The allocated resource pool is sent to the terminal and the first unit through broadcasting. The allocated resource pool is sent to the terminal, so that the terminal sends a message on the resource pool. The allocated resource pool is sent to the first unit, so that the first unit receives, on the determined resource pool, the message sent by the terminal. The sending the resource pool to the first unit is performed on a PSSCH (Physical Sidelink Shared Channel, physical sidelink shared channel).

S903: Send the configured operation mode to the first unit, where the configured operation mode is an operation mode that forwarding is performed by using the first unit.

The terminal sends, based on the resource pool determined by the network-side device, a first message on the resource pool. The first message sent may be received by the network-side device and the first unit. The network-side device performs corresponding adjustment based on the first message sent by the terminal. The corresponding adjustment includes adjusting a size of the resource pool based on a quantity of terminals.

The first unit receives the first message and sends a second message on the allocated resource pool, and sends the second message to a plurality of terminal based on the received first message. In this specific embodiment of the present invention, that the first unit sends the second message to the terminal may be forwarding the second message based on various requirements, including performing forwarding according to an instruction of the network-side device, performing forwarding at a request of the terminal, or performing automatic forwarding by the first unit.

In an example of performing forwarding according to an instruction of the network-side device, for example, the network-side device may instruct, based on a percentage of resource units of a resource pool occupied for sending the first message in all resource units included in the resource pool, whether the first unit is to send the second message to the terminal. When the percentage of the resource units of the resource pool occupied for sending the first message in all the resource units included in the resource pool exceeds a threshold, the network-side device instructs the first unit to send the second message based on the received first message. The network-side device may instruct the first unit by sending a message by using an RRC (Radio Resource Control, radio resource control) message.

Further, that the network-side device instructs the first unit to send the second message may be instructing the first unit to send all content included in the received first message, or may be instructing the first unit to send a part of the received first messages, where the part of the received first messages may be first messages sent by some terminals with a relatively high priority.

In an example of performing forwarding at a request of UE, for example, the terminal sends a forwarding request to the first unit, and the first unit sends the second message to the terminal according to the request. That the terminal sends a forwarding request to the first unit may be adding a one-byte instruction message to SCI (Sidelink Control Information, sidelink control information) to request the first unit to perform forwarding.

In an example of performing automatic forwarding by the first unit, the first unit may automatically send a message from a terminal with a high priority to the terminal, or the first unit may automatically forward all received messages.

In this specific embodiment of the present invention, the received message may be forwarded in a frequency division multiplexing manner, to avoid that the terminals cannot detect each other due to impact of a half-duplex constraint.

Figure 10:
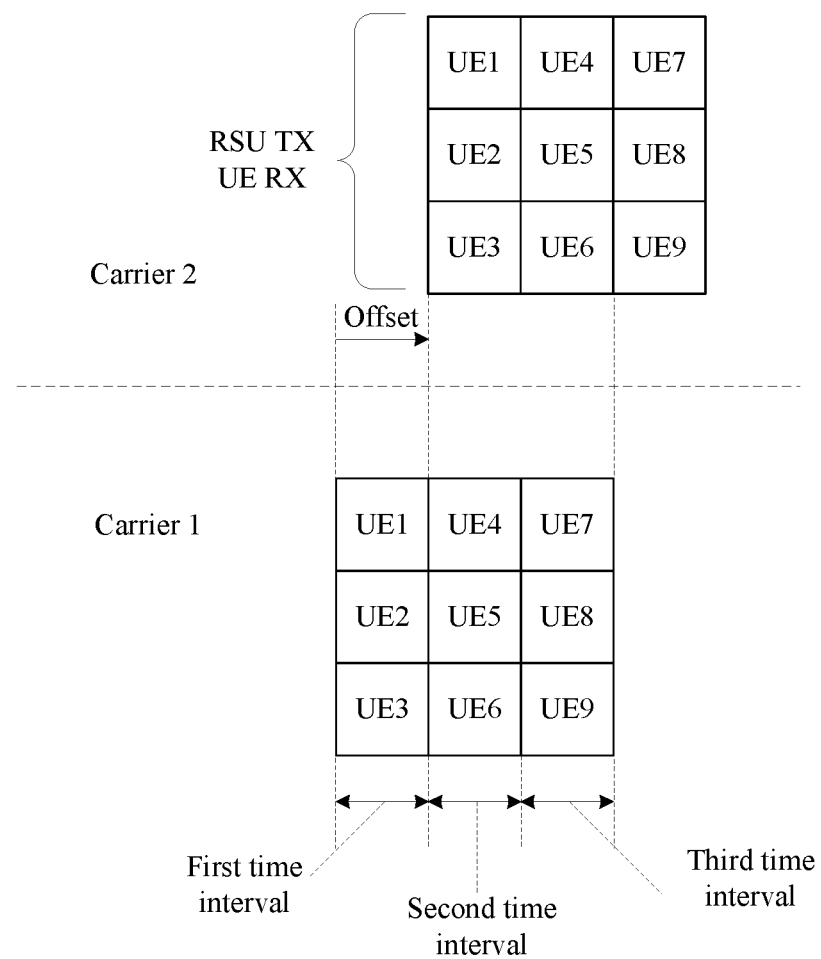
FIG. 10 is a schematic diagram of sending a second message by a first unit in a frequency division multiplexing manner according to a specific embodiment of the present invention.

FIG. 10 is a schematic diagram of sending a second message by a first unit in a frequency division multiplexing manner according to a specific embodiment of the present invention. As shown in FIG. 10, all of a plurality of terminals may send first messages on a first carrier, and a first unit may receive, on the first carrier, the first messages sent by the plurality of terminals. Only the first unit may send a second message on a second carrier, and the plurality of terminals receive, on the second carrier, the second message sent by the first unit. After receiving the first message, the first unit sends the second message on the second carrier based on the first message. In this mode, all terminals have an opportunity to detect any one of the plurality of terminals, eliminating impact brought by a half-duplex constraint.

Figure 11:
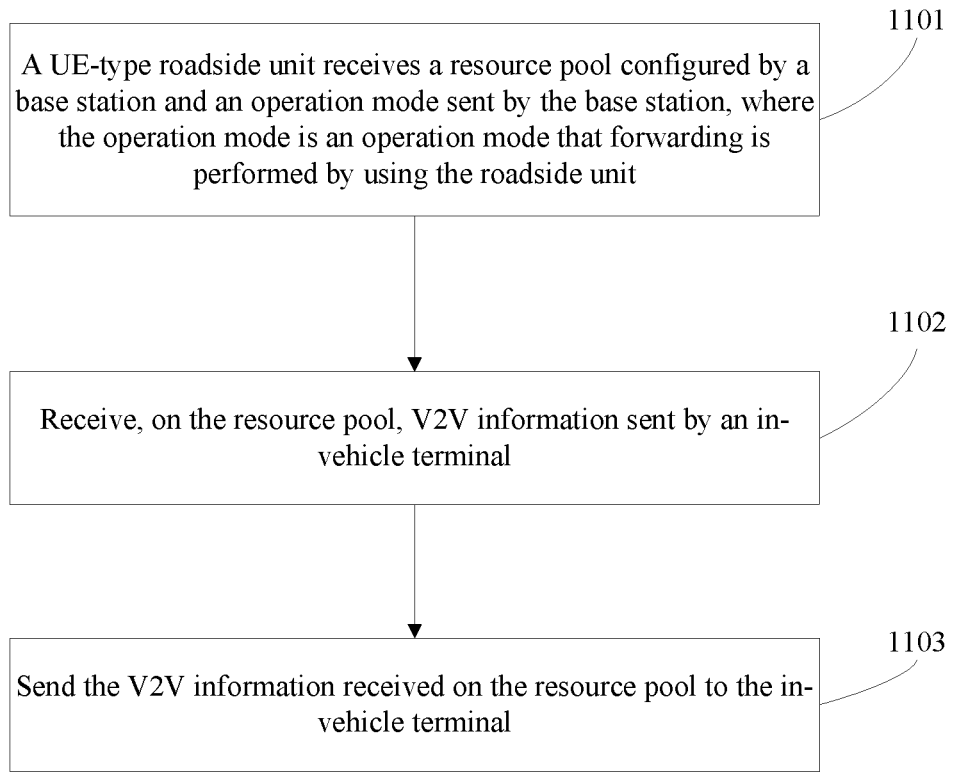
FIG. 11 is a schematic diagram of a communication method in a forwarding manner according to a specific embodiment of the present invention.

FIG. 11 is a schematic diagram of a communication method in a forwarding manner according to a specific embodiment of the present invention. As shown in FIG. 11, all terminals may send a first message on a first carrier, and a first unit receives the first message on the first carrier. Only the first unit may send a second message on a second carrier, and all the terminals can receive, on the second carrier, the second message sent by the first unit. After receiving the first message, the first unit sends the second message based on the first message. In this mode, all UEs have an opportunity to detect each other, eliminating impact brought by a half-duplex constraint. The method specifically includes:

S1101: A first unit receives a first message on a first carrier.

The first unit receives a resource pool configured by a network-side device and an operation mode sent by the network-side device, where the operation mode is an operation mode that forwarding is performed by using the first unit.

The first unit receives the resource pool sent by the network-side device and configured on the first carrier. The resource pool sent to the first unit may be sent on a PSSCH (Physical Sidelink Shared Channel, physical sidelink shared channel). In this specific embodiment of the present invention, the operation mode is an operation mode that a message is received and forwarded by using the first unit.

S1102: A terminal sends, based on a resource pool on the first carrier determined by a network-side device, the first message on the resource pool. The first message sent may be received by the network-side device and the first unit. The network-side device performs corresponding adjustment based on the first message sent by the terminal. The corresponding adjustment includes adjusting a size of the resource pool based on a quantity of terminals.

The first unit receives, on the allocated resource pool, the first message sent by the terminal.

S1103: Send a plurality of received first messages to a plurality of terminals.

In this specific embodiment of the present invention, that the first unit sends a plurality of received first messages to a plurality of terminals may be performing forwarding based on various requirements, including performing forwarding according to an instruction of the network-side device, performing forwarding at a request of UE, or performing automatic forwarding by the first unit.

In an example of performing forwarding according to an instruction of the network-side device, for example, the network-side device may instruct, based on a percentage of resource units of a resource pool occupied for sending the first message in all resource units included in the resource pool, whether the first unit is to forward the second message to the terminal based on the received first message. When a congestion level of the terminal sending the first message in the resource pool exceeds a threshold, the network-side device instructs the first unit to send the received plurality of messages. The network-side device may instruct the first unit by using an RRC (Radio Resource Control, radio resource control) message.

Further, that the network-side device instructs the first unit to send the second message may be instructing the first unit to send the second message based on all the received first messages, or may be instructing the first unit to send the second message based on a part of the received first messages, where the part of the received first messages may be first messages sent by some terminals with a relatively high priority.

In an example of performing forwarding at a request of UE, for example, the terminal sends a forwarding request to the first unit. The first unit determines to send the second message to the terminal based on the request and the first message. That the terminal sends a forwarding request to the first unit may be adding a one-bit instruction message to SCI (Sidelink Control Information, sidelink control information) to request an RSU to perform forwarding.

In an example of performing automatic forwarding by the first unit, the first unit may automatically send the second message to the terminal based on a first message of a terminal with a high priority, or the first unit may automatically send the second message based on all the received first messages.

In this specific embodiment of the present invention, the received message may be forwarded in a frequency division multiplexing manner or a time division multiplexing manner, to avoid that the terminals cannot detect each other due to impact of a half-duplex constraint.

The time division multiplexing manner means that a time-frequency resource used for sending the second message by the first unit and a time-frequency resource used for the first message are grouped into separate resource pools in terms of time.

The frequency division multiplexing manner means that a time-frequency resource used for sending the second message by the first unit and a time-frequency resource used for the first message are grouped into separate resource pools in terms of frequency; and the separate resource pools grouped in terms of frequency may be resource pools on different carriers, or may be resource pools on a same carrier.

Figure 12:
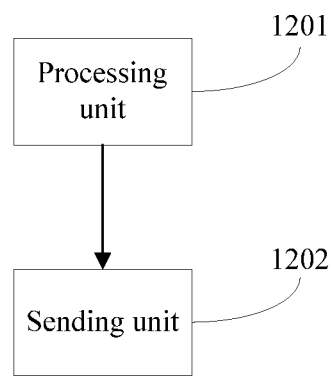
FIG. 12 shows a network-side device according to a specific embodiment of the present invention.

FIG. 12 shows a network-side device according to a specific embodiment of the present invention. As shown in FIG. 12, the network-side device may be a base station, and the network-side device specifically includes:

a processing unit S1201, configured to determine a network deployment policy, where the network deployment policy includes that the network-side device configures a plurality of carriers for inter-terminal communication and one or more resource pools are configured for each of the plurality of carriers;

the processing unit 1202 is further configured to determine an operation mode of a terminal based on the resource configuration policy, where the operation mode is used to instruct the terminal to perform sending and/or receiving on one or more resource pools of the plurality of carriers; and a sending unit S1203, configured to broadcast information about the configured one or more resource pools and the operation mode, so that the terminal sends and/or receives information based on the configured plurality of resource pools, and determine, based on the operation mode, that the terminal sends information on one or more resource units of the one or more resource pools.

Figure 13:
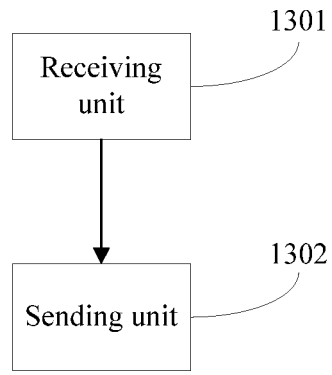
FIG. 13 shows a terminal according to a specific embodiment of the present invention.

FIG. 13 shows a terminal according to a specific embodiment of the present invention. As shown in FIG. 13, the terminal specifically includes:

a receiving unit S1301, configured to receive a network deployment policy and an operation mode, where the network deployment policy includes that a network-side device configures a plurality of carriers for inter-terminal communication and one or more resource pools are configured for each carrier, and the operation mode is used to instruct the terminal to perform sending and/or receiving on one or more resource pools; and a sending unit S1302, configured to send a to-be-sent message on one or more resource units of one carrier, or on one or more resource units of the plurality of carriers based on the operation mode.

Figure 14:
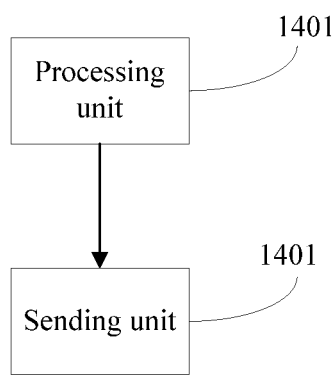
FIG. 14 shows a terminal according to a specific embodiment of the present invention.

FIG. 14 shows a terminal according to a specific embodiment of the present invention. As shown in FIG. 14, the terminal includes:

a processing unit S1401, configured to determine a multi-carrier operation mode and a resource pool, where the multi-carrier operation mode and the resource pool may be preconfigured, and the preconfigured multi-carrier operation mode includes a first mode, and/or a second mode, and/or a third mode, the first mode is used to indicate whether the terminal is allowed to send a message and/or receive a message on at least one carrier within one time interval, the second mode is used to indicate whether the terminal is allowed to receive a message and/or send a message on a plurality of the plurality of carriers for one or more times, and the third mode is used to indicate whether the terminal is allowed to send a message on one of the plurality of carriers, and/or is allowed to receive a message on at least one carrier; and a sending unit S1402, configured to transmit a message on one or more resource units of a plurality of resource pools.

Figure 15:
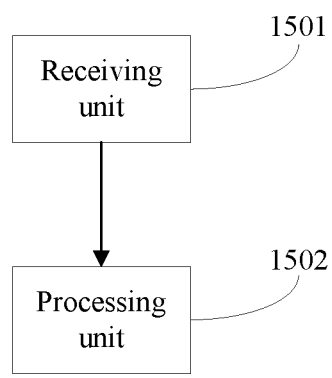
FIG. 15 shows a terminal according to a specific embodiment of the present invention.

FIG. 15 shows a terminal according to a specific embodiment of the present invention. As shown in FIG. 15, the terminal specifically includes:

a receiving unit S1501, configured to receive a plurality of first messages sent by a plurality of terminals on a first carrier, where the first carrier is a carrier on which a first terminal sends the first message; and a processing unit S1502, configured to determine, based on the received first messages, an operation mode used when the terminal sends the first message on the first carrier, where the operation mode is used to instruct the terminal to perform sending and/or receiving on one or more resource pools.

The first terminal determines that none of the plurality of terminals broadcast the operation mode, and broadcasts the determined multi-carrier operation mode, so that the plurality of terminals send the first messages based on the operation mode broadcast by the first terminal.

The operation mode used when the terminal sends the first message on the first carrier is determined based on statistics information of the first message, where the statistics information of the first message includes a quantity of terminals that send the first messages on the first carrier.

Figure 16:
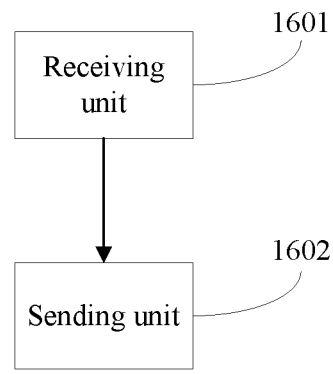
FIG. 16 shows a first unit according to a specific embodiment of the present invention.

FIG. 16 shows a first unit according to a specific embodiment of the present invention. As shown in FIG. 16, the first unit includes:

a receiving unit S1601, configured to receive first messages on a first carrier, where the first messages are a plurality of first messages sent by a plurality of terminals on the first carrier; and a sending unit S1602, configured to send a second message in a time division multiplexing manner or a frequency division multiplexing manner, where the sending a second message is sending the received plurality of first messages to the plurality of terminals, so that the plurality of terminals are able to receive first messages sent by all other terminals of the plurality of terminals on the first carrier.

The time division multiplexing manner means that a time-frequency resource used for sending the second message by the first unit and a time-frequency resource used for the first message are grouped into separate resource pools in terms of time.

The frequency division multiplexing manner means that a time-frequency resource used for sending the second message by the first unit and a time-frequency resource used for the first message are grouped into separate resource pools in terms of frequency; and the separate resource pools grouped in terms of frequency may be resource pools on different carriers, or may be resource pools on a same carrier.

Figure 17:
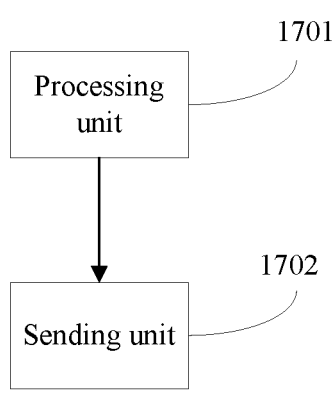
FIG. 17 shows a network-side device according to a specific embodiment of the present invention.

FIG. 17 shows a network-side device according to a specific embodiment of the present invention. As shown in FIG. 17, the network-side device specifically includes:

a processing unit S1701, configured to configure an operation mode and configure a resource, where the operation mode is a mode that a message is received and forwarded by using a first unit, and the configuring a resource is allocating a resource pool, where the resource pool is a resource pool on a first carrier, and the resource pool on the first carrier is a resource pool that is available for inter-terminal communication; and a sending unit S1702, configured to: broadcast the allocated resource pool, so that a plurality of terminals send first messages on the allocated resource pool of the first carrier, and the first unit receives the first messages sent by the plurality of terminals on the allocated resource pool of the first carrier; and send the configured operation mode to the first unit, so that when the first unit detects that the plurality of terminals send the first messages on the resource pool of the first carrier, the first unit receives the first messages sent by the plurality of terminals on the resource pool of the first carrier, forwards the received first messages to the plurality of terminals on a second carrier, and/or forwards the received first messages to the plurality of terminals on a resource unit of the first carrier different from a resource unit occupied for the first messages.

Figure 18:
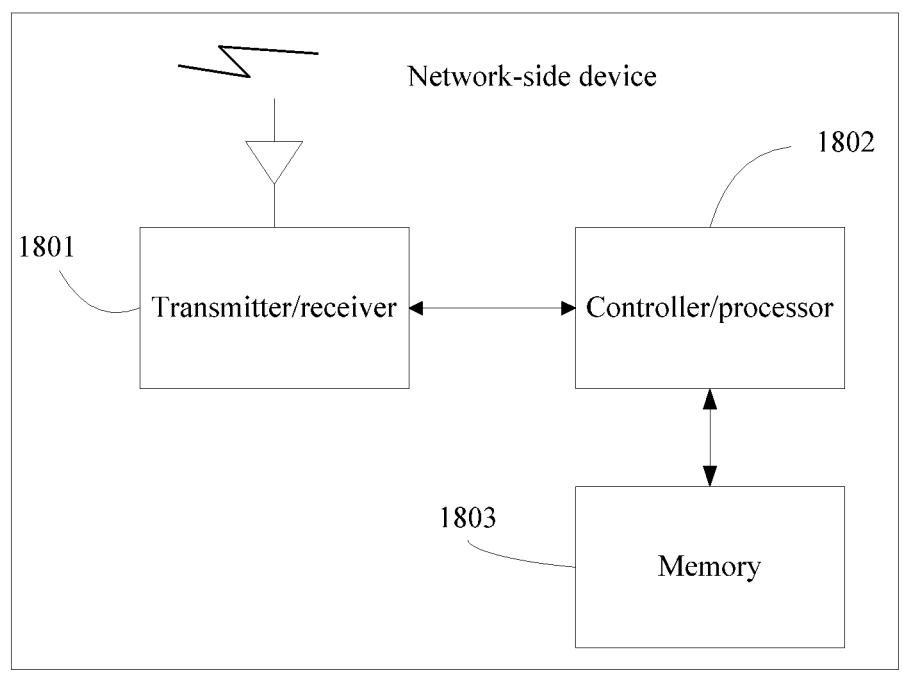
FIG. 18 shows a possible schematic structural diagram of a network-side device in the foregoing embodiments.

FIG. 18 shows a possible schematic structural diagram of a network-side device in the foregoing embodiments.

The network-side device includes a transmitter/receiver 1801, a controller/processor 1802, and a memory 1803. The transmitter/receiver 1801 is configured to support the network-side device in sending information to and receive information from the terminal device in the foregoing embodiments.

The controller/processor 1802 performs various functions for communicating with the terminal device. In uplink, an uplink signal from the terminal device is received by an antenna, demodulated by the receiver 1801, and further processed by the controller/processor 1802, to recover service data and signaling information sent by the terminal device. In downlink, the service data and a signaling message are processed by the controller/processor 1802, and modulated by the transmitter 1801 to generate a downlink signal, and the downlink signal is transmitted to the terminal device by the antenna. The memory 1803 is configured to store program code and data of the network-side device.

It can be understood that FIG. 18 shows only a simplified design of the network-side device. In actual application, the network-side device may include any quantities of transmitters, receivers, processors, controllers, memories, communications units, and the like. All network-side devices that can implement the present invention shall fall within the protection scope of the present invention.

Figure 19:
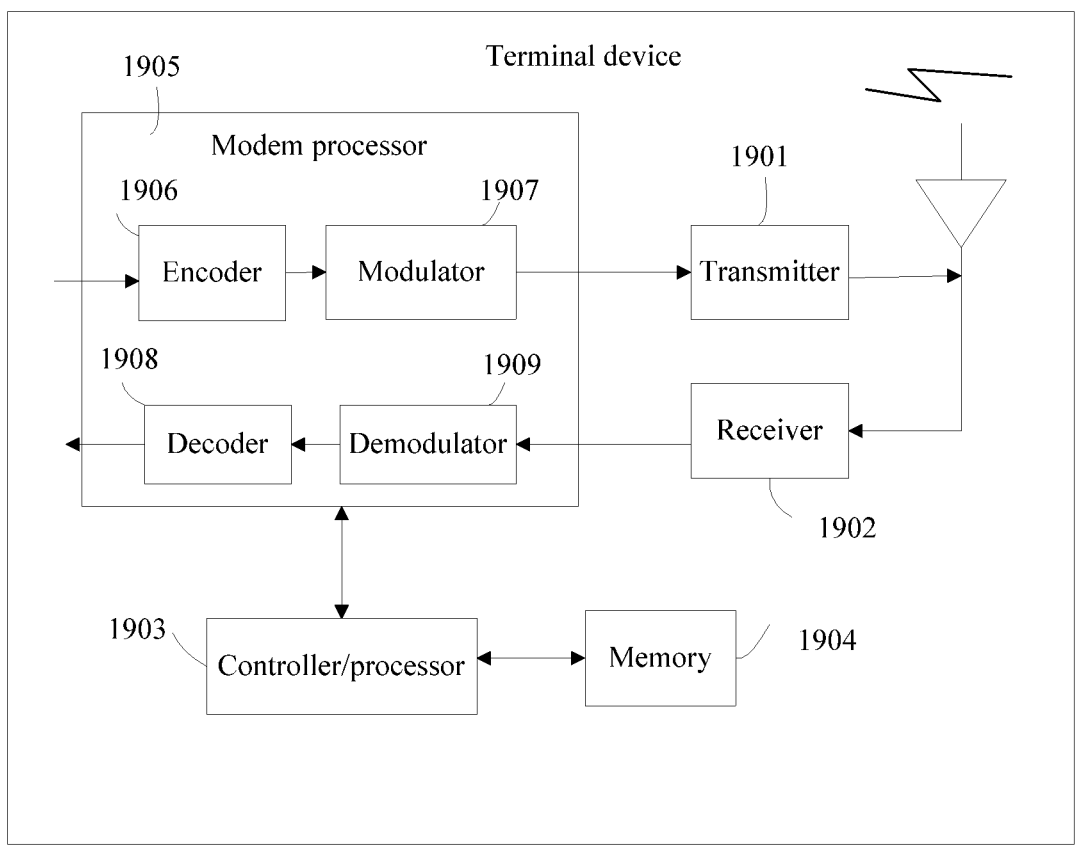
FIG. 19 is a simplified schematic diagram of a possible design structure of a terminal device in the foregoing embodiments.

FIG. 19 is a simplified schematic diagram of a possible design structure of a terminal device in the foregoing embodiments. The terminal device includes a transmitter 1901, a receiver 1902, a controller/processor 1903, a memory 1904, and a modem processor 1905.

The transmitter 1901 adjusts (for example, digital-analog converts, filters, amplifies, and up-converts) an output sample and generates an uplink signal. The uplink signal is transmitted by an antenna to the network-side device in the foregoing embodiment. In downlink, the antenna receives a downlink signal transmitted by the network-side device in the foregoing embodiment. The receiver 1902 adjusts (for example, filters, amplifies, down-converts, and digitalizes) the signal received from the antenna and provides an input sample. In the modem processor 1905, an encoder 1906 receives service data and a signaling message that are to be sent on an uplink, and processes (for example, formats, encodes, and interleaves) the service data and the signaling message. A modulator 1907 further processes the encoded service data and signaling message (for example, performs symbol mapping and modulation) and provides an output sample. A demodulator 1909 processes (for example, demodulates) the input sample and provides symbol estimation. A decoder 1808 processes (for example, de-interleaves and decodes) the symbol estimation and provides the decoded data and signaling message to UE. The encoder 1806, the modulator 1807, the demodulator 1809, and the decoder 1808 may be implemented by the combined modem processor 1805. These units perform processing according to a radio access technology (for example, an access technology used by an LTE system and other evolved systems) used by a radio access network.

The controller/processor 1803 controls and manages an action of the terminal device and is configured to perform processing implemented by the terminal device in the foregoing embodiments. For example, the controller/processor 1903 is configured to control the terminal device to measure channel state information and/or complete other procedures of the technology described in the present invention. The memory 1804 is configured to store program code and data used for the UE.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are described with further detail. It should be understood that the foregoing descriptions are merely specific implementations of the present invention, but are not intended to limit the protection scope of the present invention. Any modification, equivalent replacement, or improvement made without departing from the principle of the present invention shall fall within the protection scope of the present invention.

The invention claimed is:

1. A communication method, wherein the communication method comprises:
   receiving, by a terminal, a resource configuration policy, wherein the resource configuration policy comprises information indicating at least one carrier of a plurality of carriers for inter-terminal communication, each carrier of the plurality of carriers being configured with a plurality of resource pools; and
   determining, by the terminal, an operation mode, wherein the operation mode is a first mode or a second mode;
   sending, by the terminal in response to the operation mode being determined as the second mode, the first message on each of one or more carriers among the plurality of carriers, wherein first messages mapped to different carriers are same or different redundancy versions of a same message.

2. The communication method according to claim 1, wherein the plurality of carriers are determined based on at least one of: a priority of the terminal, a priority of a terminal service, a probability of sending the first message on each carrier by the terminal, or a usage status of a respective resource pool of the plurality of resource pools configured on each carrier.

3. The communication method according to claim 1, wherein the plurality of carriers are determined based on a resource unit occupied in a resource pool of the plurality of resource pools selected by the terminal to listen to another terminal.

4. The communication method according to claim 1, further comprising:
   sending, by the terminal in response to the operation mode being determined as the first mode, the first message on the at least one carrier of the plurality of carriers during one time interval.

5. The communication method according to claim 4, further comprising:
   determining, based on at least one of a priority of the terminal, a priority of a terminal service, a probability of sending the first message on each carrier of the plurality of carriers by the terminal, or a resource unit of the plurality of resource pools selected by the terminal to listen to another terminal, whether the terminal is allowed to send the first message on the selected resource unit.

6. The communication method according to claim 1, further comprising:
   sending, by the terminal, a usage status of a resource pool of the plurality of resource pools to a network device, wherein the usage status of the resource pool is determined based on a message sent by another terminal and received by the terminal, and the sent usage status of the resource pool comprises a usage proportion of the resource pool.

7. An apparatus, comprising:
a receiver, configured to receive a resource configuration policy, wherein the resource configuration policy comprises information indicating at least one carrier for inter-terminal communication, each carrier of a plurality of carriers being configured with a plurality of resource pools; and
a processor, configured to determine an operation mode, wherein the operation mode is a first mode or a second mode;
a transmitter, configured to send, in response to the operation mode being determined as the second mode, a first message on each of one or more carriers among the plurality of carriers, wherein first messages mapped to different carriers are same or different redundancy versions of a same message.

8. The apparatus according to claim 7, wherein the plurality of carriers are determined based on at least one of: a priority of the terminal, a priority of a terminal service, a probability of sending the first message on each carrier by the terminal, or a usage status of a respective resource pool of the plurality of resource pools configured on each carrier.

9. The apparatus according to claim 7, wherein the plurality of carriers are determined based on a resource unit occupied in a resource pool of the plurality of resource pools selected by the terminal to listen to another terminal.

10. The apparatus according to claim 7, wherein the transmitter is further configured to:
send, in response to the operation mode being determined as the first mode, the first message on the at least one carrier of the plurality of carriers during one time interval.

11. The apparatus according to claim 10, wherein the processor is further configured to:
determine, based on at least one of a priority of the terminal, a priority of a terminal service, a probability of sending the first message on each carrier of the plurality of carriers by the terminal, or a resource unit of the plurality of resource pools selected by the terminal to listen to another terminal, whether the terminal is allowed to send the first message on the selected resource unit.

12. The apparatus according to claim 7, wherein the transmitter is further configured to:
send, by the terminal, a usage status of a resource pool of the plurality of resource pools to a network device, wherein the usage status of the resource pool is determined based on a message sent by another terminal and received by the terminal, and the sent usage status of the resource pool comprises a usage proportion of the resource pool.

13. An apparatus, comprising:
a processor, configured to determine a plurality of resource pools and an operation mode, wherein the plurality of resource pools are preconfigured on a first plurality of carriers and the operation mode is a first mode or a second mode;
a transmitter configured to send, in response to the operation mode being determined as the second mode, a first message on each of one or more carriers among a second plurality of carriers among the first plurality of carriers, wherein first messages mapped to different carriers among the second plurality of carriers are same or different redundancy versions of a same message.

14. The apparatus according to claim 13, wherein the second plurality of carriers are determined based on at least one of: a priority of the terminal, a priority of a terminal service, a probability of sending the first message on each carrier by the terminal, or a usage status of a respective resource pool of the plurality of resource pools configured on each carrier.

15. The apparatus according to claim 14, wherein the second plurality of carriers are determined based on a resource unit of the plurality of resource pools selected the terminal to listen to another terminal.

16. The apparatus according to claim 14, wherein the transmitter is further configured to:
send, in response to the operation mode being determined as the first mode, the first message on each carrier of the second plurality of carriers among the first plurality of carriers during one time interval.

17. The apparatus according to claim 16, wherein the processor is further configured to:
determine, based on one of a priority of the terminal, a priority of a terminal service, a probability of sending the first message on each carrier of the second plurality of carriers by the terminal, or a resource unit of the plurality of resource pools selected by the terminal to listen to another terminal, whether the terminal is allowed to send the first message on the selected resource unit.

* * * * *